United States Patent
Kuroki et al.

(10) Patent No.: US 8,997,079 B2
(45) Date of Patent: Mar. 31, 2015

(54) IMAGE FORMING APPARATUS CAPABLE OF UPDATING CONTROL PROGRAM, AND STORAGE MEDIUM

(71) Applicant: Canon Kabushiki Kaisha, Tokyo (JP)

(72) Inventors: Kenji Kuroki, Toride (JP); Hiroto Nishihara, Toride (JP); Hiroyuki Eda, Moriya (JP); Tsuyoshi Shiga, Kashiwa (JP); Tadaaki Saida, Kashiwa (JP); Ryou Sakaguchi, Toride (JP); Atsushi Chaki, Tokyo (JP)

(73) Assignee: Canon Kabushiki Kaisha (JP)

( * ) Notice: Subject to any disclaimer, the term of this patent is extended or adjusted under 35 U.S.C. 154(b) by 212 days.

(21) Appl. No.: 13/676,431

(22) Filed: Nov. 14, 2012

(65) Prior Publication Data

US 2013/0132935 A1    May 23, 2013

(30) Foreign Application Priority Data

Nov. 18, 2011   (JP) .................... 2011-252667

(51) Int. Cl.
*G06F 9/44*    (2006.01)
*G06F 9/445*   (2006.01)

(52) U.S. Cl.
CPC .. *G06F 8/665* (2013.01); *G06F 8/65* (2013.01)
USPC ........................................................ 717/168

(58) Field of Classification Search
CPC ........................................................ G06F 8/65
USPC ........................................................... 717/168
See application file for complete search history.

(56) References Cited

U.S. PATENT DOCUMENTS

| | | | |
|---|---|---|---|
| 7,142,321 B2 * | 11/2006 | Tomita et al. | 358/1.15 |
| 2007/0080776 A1 * | 4/2007 | Suwabe et al. | 340/5.2 |
| 2008/0263540 A1 * | 10/2008 | Bando et al. | 717/173 |
| 2011/0161881 A1 * | 6/2011 | Tomita et al. | 715/825 |
| 2012/0062948 A1 * | 3/2012 | Nishikawa | 358/1.15 |

FOREIGN PATENT DOCUMENTS

| | | |
|---|---|---|
| JP | 2001-273143 A | 10/2001 |
| JP | 2007-108957 A | 4/2007 |

* cited by examiner

*Primary Examiner* — Qing Chen
*Assistant Examiner* — Clint A Thatcher
(74) *Attorney, Agent, or Firm* — Rossi, Kimms & McDowell LLP

(57) ABSTRACT

An image forming apparatus which makes it possible to perform an image forming operation even during update of a control program. The image forming apparatus is provided with distributed module controllers each including a sub CPU and a flash ROM storing a control program for controlling the sub CPU. The main CPU of the image forming apparatus updates the control programs stored in the respective flash ROMs. The main CPU displays a screen that enables selection of functions to be used in an image forming job executed by the image forming apparatus. During execution of update of a control program targeted for update, out of the selectable functions, the main CPU disables a function which uses a sub CPU associated with the control program.

10 Claims, 22 Drawing Sheets

FIG. 11A

Table of Sub-CPU Updating Status (1101)

| Module (1101) | Status (1107) | Remain (1108) |
|---|---|---|
| YMC Drum Controller SubCPU (1102) | Updating | 8192 Bytes |
| Bk Drum/ITB Controller SubCPU (1103) | Active | |
| Option Cassette Driver SubCPU (1104) | Active | |
| Reverse/ReFeed Driver SubCPU (1105) | Updating | 10240 Bytes |
| Buffer Path/Finisher Driver SubCPU (1106) | Active | |

FIG. 11B

Table of Sub-CPU Updating Status (1101)

| Module (1101) | Status (1107) | Remain (1108) |
|---|---|---|
| YMC Drum Controller SubCPU (1102) | Active | |
| Bk Drum/ITB Controller SubCPU (1103) | Active | |
| Option Cassette Driver SubCPU (1104) | Updating | 20480 Bytes |
| Reverse/ReFeed Driver SubCPU (1105) | Active | |
| Buffer Path/Finisher Driver SubCPU (1106) | Updating | 10480 Bytes |

FIG. 11C

Table of Sub-CPU Updating Status (1101)

| Module (1101) | Status (1107) | Remain (1108) |
|---|---|---|
| YMC Drum Controller SubCPU (1102) | Active | |
| Bk Drum/ITB Controller SubCPU (1103) | Active | |
| Option Cassette Driver SubCPU (1104) | Active | |
| Reverse/ReFeed Driver SubCPU (1105) | Updating | 8192 Bytes |
| Buffer Path/Finisher Driver SubCPU (1106) | Updating | 10240 Bytes |

FIG. 11D

Table of Sub-CPU Updating Status (1101)

| Module (1101) | Status (1107) | Remain (1108) |
|---|---|---|
| YMC Drum Controller SubCPU (1102) | Updating | 3072 Bytes |
| Bk Drum/ITB Controller SubCPU (1103) | Active | |
| Option Cassette Driver SubCPU (1104) | Active | |
| Reverse/ReFeed Driver SubCPU (1105) | Active | |
| Buffer Path/Finisher Driver SubCPU (1106) | Active | |

FIG. 13

| FUNCTION ID | FUNCTIONAL CLASSIFICATION | OPTION | IN-USE SUB CPU |
|---|---|---|---|
| 1 | SHEET FEEDER ID | CASSETTE 1 | |
| 2 | | CASSETTE 2 | Option Cassette Feed Driver |
| 3 | | CASSETTE 3 | Option Cassette Feed Driver |
| 4 | COLOR MODE | MONOCHROME | BK Drum/ITB Driver |
| 5 | | COLOR | BK Drum/ITB Driver, YMC Drum Driver |
| 7 | SINGLE-SIDED/ DOUBLE-SIDED | SINGLE-SIDED | |
| 8 | | DOUBLE-SIDED | Reverse Motor Driver |
| 9 | DISCHARGE DESTINATION ID | TRAY 1 | |
| 10 | | FINISHER UPPER TRAY | BufferPath Driver, Finisher Controller |
| 11 | | FINISHER LOWER TRAY | BufferPath Driver, Finisher Controller |

| SHEET FEEDER ID | COLOR MODE | SINGLE-SIDED /DOUBLE-SIDED | DISCHARGE DESTINATION ID | POST-PROCESSING MODE | ... | ... |
|---|---|---|---|---|---|---|
| CASSETTE 1 | COLOR | DOUBLE-SIDED | TRAY 1 | NON-SORT | | |

PRINT MODE INFORMATION 1501

1502, 1503, 1504, 1505, 1506

IMAGE FORMING APPARATUS CAPABLE OF UPDATING CONTROL PROGRAM, AND STORAGE MEDIUM

BACKGROUND OF THE INVENTION

1. Field of the Invention

The present invention relates to an image forming apparatus equipped with modules having respective microprocessors, and a storage medium.

2. Description of the Related Art

Conventionally, as a technique concerning update of firmware installed in an image forming apparatus, there has been proposed a firmware update system (see e.g. Japanese Patent Laid-Open Publication No. 2007-108957). The firmware update system described in Japanese Patent Laid-Open Publication No. 2007-108957 upgrades the version of firmware by the following control:

In the case of updating one software part associated with a print job, it is determined whether or not a print job reserved as a timer job awaiting execution includes an operation requiring the use of the software part to be updated. If it is determined that the reserved print job includes no such operation, the software part is updated.

If it is determined that the reserved print job includes such an operation but that a software part provided in another image forming apparatus on a network can be used as an alternative to the software part to be updated, rescheduling is performed so as to use the image forming apparatus that can be used. On the other hand, if it is determined that there is no image forming apparatus that can be used as an alternative, the update request is made pending.

By performing the above-described control, it is possible not only to delete and update firmware at high speed, but also to delete and update a software part for executing a timer job, in a timing deemed appropriate such that a general job can be performed without any trouble.

Further, there has conventionally been proposed another firmware update system (see e.g. Japanese Patent Laid-Open Publication No. 2001-273143). The firmware update system described in Japanese Patent Laid-Open Publication No. 2001-273143 upgrades the version of firmware by the following control:

In a system where firmware is downloaded from an external apparatus so as to be temporarily stored in a RAM (backup RAM) area, and is then written in a PROM area, first, the firmware is temporarily stored in the RAM (backup RAM) area and is then reset. Further, the system has a firmware update function of writing the firmware stored in the RAM (backup RAM) area into the PROM area and then starting the operation of the firmware, and detects a job which is being executed and a job which is awaiting execution. The system makes the operation of the firmware update function pending for the duration of time that a job currently being executed and a job waiting execution are detected.

In recent years, there has been an increasing demand for the use of an image forming apparatus as a center printer in an office, and therefore it is demanded that an image forming apparatus executes its functions with further reduced downtime. In particular, it is demanded to solve a problem with the conventional technique that the print function of an image forming apparatus cannot be used at all during update of firmware in the image forming apparatus.

In the above-mentioned conventional technique (prior art), it is possible to update firmware without turning on/off the power of an image forming apparatus. However, a print job input to the image forming apparatus after the start of upgrade of the version of firmware is not mentioned.

For example, in the method mentioned in the conventional technique, even when firmware of a post-processing apparatus (finisher) connected to an image forming apparatus is under update, it is possible to continue the operation of the system, but there is no means established for receiving a print job. Therefore, improvement of user friendliness is sometimes insufficient.

In the case of issuing a print job to an image forming apparatus, a user needs to ensure that update of firmware is not being performed, before issuing the print job. For this reason, irrespective of the contents and kind of a module targeted for firmware update, the user cannot issue a print job to the image forming apparatus until the firmware update is completed.

SUMMARY OF THE INVENTION

The present invention provides an image forming apparatus which makes it possible to perform an image forming operation even during update of a control program, and a storage medium.

In a first aspect of the present invention, there is provided an image forming apparatus including a plurality of microprocessors and a plurality of storage units storing control programs provided in association with the respective microprocessors, comprising an update unit configured to update the control programs stored in the respective storage units, a selection unit configured to enable selection of functions to be used in an image forming job caused to be executed by the image forming apparatus, and a control unit configured to, during execution of update of a control program targeted for update by the update unit, disable, out of the functions made selectable by the selection unit, a function which uses a microprocessor associated with the control program targeted for update.

In a second aspect of the present invention, there is provided an image forming apparatus including a plurality of microprocessors and a plurality of storage units storing control programs provided in association with the respective microprocessors, comprising an update unit configured to update the control programs stored in the respective storage units, a selection unit configured to enable selection of functions to be used in an image forming job caused to be executed by the image forming apparatus, and a control unit configured to, during execution of update of a control program targeted for update by the update unit, select, out of the functions made selectable by the selection unit, a function which does not use a microprocessor associated with the control program targeted for update, and present the selected function as an alternative function.

In a third aspect of the present invention, there is provided a non-transitory computer-readable storage medium storing a computer-executable program for causing a computer to execute a method of controlling an image forming apparatus including a plurality of microprocessors and a plurality of storage units storing control programs provided in association with the respective microprocessors, wherein the method comprises updating the control programs stored in the respective storage units, enabling selection of functions to be used in an image forming job caused to be executed by the image forming apparatus, and disabling, during execution of update of a control program targeted for update by the updating, out of the functions made selectable by the enabling of the selection, a function which uses a microprocessor associated with the control program targeted for update.

In a fourth aspect of the present invention, there is provided a non-transitory computer-readable storage medium storing a computer-executable program for causing a computer to execute a method of controlling an image forming apparatus including a plurality of microprocessors and a plurality of storage units storing control programs provided in association with the respective microprocessors, wherein the method comprises updating the control programs stored in the respective storage units, enabling selection of functions to be used in an image forming job caused to be executed by the image forming apparatus, and selecting, during execution of update of a control program targeted for update by the updating, out of the functions made selectable by the enabling of the selection, a function which does not use a microprocessors associated with the control program targeted for update, and presenting the selected function as an alternative function.

According to the present invention, during execution of update of a control program targeted for update in the image forming apparatus, out of functions selectable for use in an image forming job, a function which uses a microprocessor associated with the control program targeted for update is disabled. This makes it possible to start an image forming job or continue execution of the image forming job even during execution of update of a control program in the image forming apparatus, to thereby achieve further reduction of downtime during the use of the image forming apparatus.

Further features of the present invention will become apparent from the following description of exemplary embodiments with reference to the attached drawings.

BRIEF DESCRIPTION OF THE DRAWINGS

FIG. 11A is a view of a sub CPU firmware update status table.

FIG. 11B is a view of a sub CPU firmware update status table.

FIG. 11C is a view of a sub CPU firmware update status table.

FIG. 11D is a view of a sub CPU firmware update status table.

FIG. 13 is a view of a function ID-sub CPU association table.

FIG. 15 is a view of a print mode information table in an image forming apparatus according to a second embodiment of the present invention.

DESCRIPTION OF THE EMBODIMENTS

The present invention will now be described in detail below with reference to the accompanying drawings showing embodiments thereof.

Figure 1:
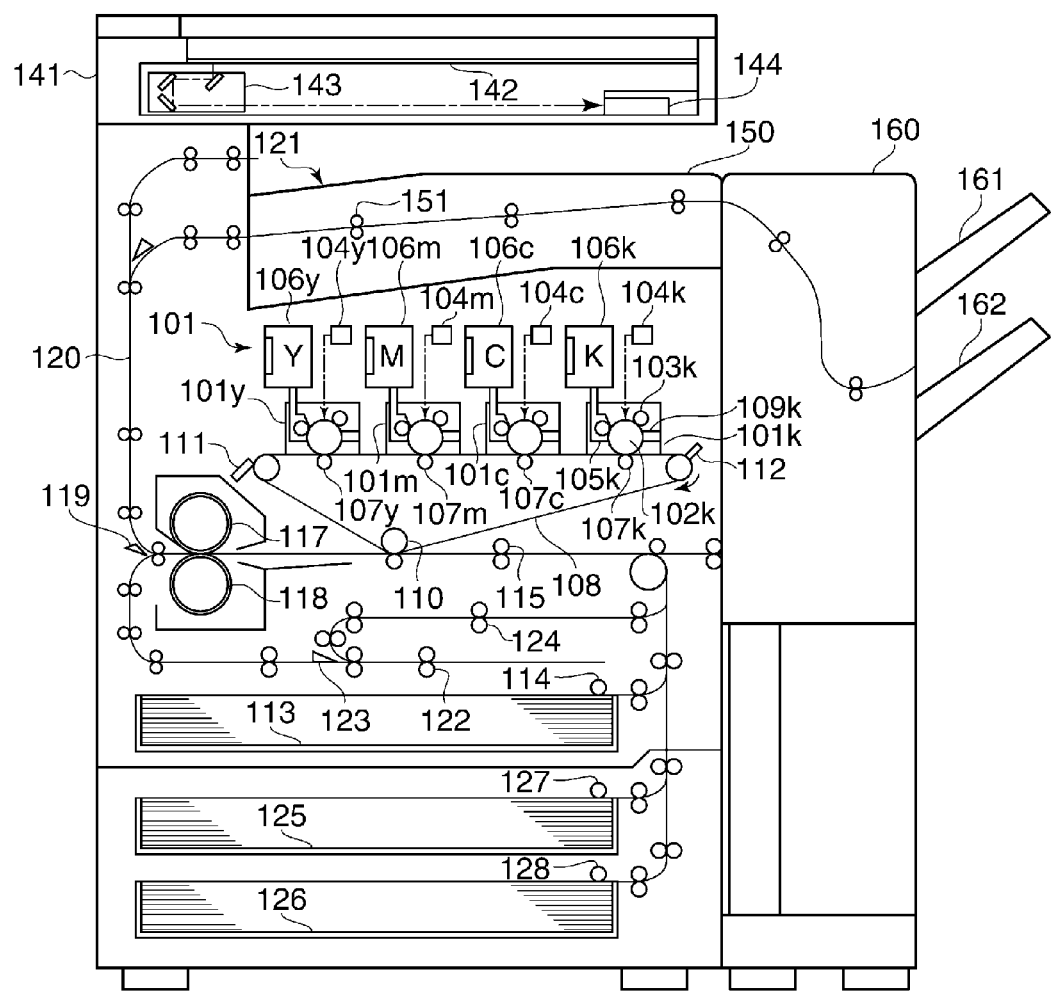
FIG. 1 is a view of the internal construction of an image forming apparatus according to a first embodiment of the present invention.

FIG. 1 is a view of the internal construction of an image forming apparatus according to a first embodiment of the present invention.

Referring to FIG. 1, the image forming apparatus is implemented by a multifunction peripheral comprising an image reading section 141, a main unit of the image forming apparatus, and a finisher 160. The image reading section 141 includes an original platen glass 142, an optical unit 143, and an image pickup section 144. The main unit of the image forming apparatus has an image forming section 101 including process units 101y, 101m, 101c, and 101k associated with yellow (Y), magenta (M), cyan (C), and a black (K), respectively. The finisher 160 performs post-processing (sorting, stapling, etc.) on sheets having undergone image formation.

The process unit 101k includes a photosensitive drum 102k, an electrostatic charging roller 103k, a developing device 105k, and an auxiliary charging brush 109k. In FIG. 1, only the photosensitive drum, electrostatic charging roller, developing device, and auxiliary charging brush of the process unit 101k are denoted by the respective reference numerals, and reference numerals for those of the other process units 101y, 101m, and 101c are omitted. In the following, only the process unit 101k will be described by way of example, and description of the other process units 101y, 101m, and 101c, each of which is identical to the process unit 101k, is omitted.

The photosensitive drum 102k is contained in a central part of the process unit 101k and is driven for rotation by a drum motor (not shown). The electrostatic charging roller 103k applies a high voltage to the photosensitive drum 102k to thereby uniformly charge the surface of the photosensitive drum 102k. A laser scanner unit 104k is configured to irradiate the photosensitive drum 102k, via a polygon mirror rotary member, not shown, with a modulated laser beam output from a laser diode, not shown, to scan the photosensitive drum 102k in the longitudinal direction. The laser scanner unit 104*k* performs laser exposure according to input image information to thereby form an electrostatic latent image on the uniformly charged photosensitive drum 102*k*.

The developing device 105*k* uses a two-component developer including a toner and a carrier to form a visible toner image corresponding to the electrostatic latent image on the uniformly charged photosensitive drum 102*k*. A toner bottle 106*k* supplies toner to the developing device 105*k*. A primary transfer roller 107*k* is disposed in facing relation to the photosensitive drum 102*k* and primarily transfers the toner image from the photosensitive drum 102*k* to an intermediate transfer member 108 which is an endless belt member provided for sequential superimposition of Y, M, C, and K colors. The auxiliary charging brush 109*k* charges residual toner remaining on the photosensitive drum 102*k* after toner image transfer by the primary transfer roller 107*k* such that the residual toner comes to carry uniform electric charge.

Similarly, laser scanner units 104*y*, 104*m*, and 104*c* and toner bottles 106*y*, 106*m*, and 106*c* are provided for the respective process units 101*y*, 101*m*, and 101*c*. Further, primary transfer rollers 107*y*, 107*m*, and 107*c* are disposed in facing relation to the photosensitive drums of the respective process units 101*y*, 101*m*, and 101*c*. In the following description, the photosensitive drums, the electrostatic charging rollers, the developing devices, and the auxiliary charging brushes may be generically referred to as the photosensitive drum 102, the electrostatic charging roller 103, the developing device 105, and the auxiliary charging brush 109, respectively. In this case, description thereof applies to any of the devices associated with the respective colors Y, M, C, and K.

A toner image primarily transferred onto the intermediate transfer member 108 is secondarily transferred onto a sheet by a secondary transfer roller 110. Residual toner left remaining on the secondary transfer roller 110 after the secondary transfer or adjustment toner unintended to be transferred onto the sheet is collected by an intermediate transfer member cleaner 111. A pattern density detection sensor 112 detects a change in density of a pattern formed on the intermediate transfer member 108.

A sheet contained in a sheet feed cassette 113 (sheet feeder) is fed by a sheet feed roller 114, and after having its skew corrected by a registration roller 115, the sheet is conveyed to the secondary transfer roller 110. The sheet has a toner image transferred onto a first surface thereof by the secondary transfer roller 110, and then toner is thermally fixed by a fixing roller 117 and a pressure roller 118. Thereafter, the sheet is conveyed into a discharge path 120 by a discharge flapper 119, and is then discharged onto a discharge tray 121 (discharging section) or is conveyed to a double-sided printing inversion drive roller 122.

The sheet conveyed to the double-sided printing inversion drive roller 122 is further conveyed to a double-sided printing refeed drive roller 124 by reverse rotation of the double-sided printing inversion drive roller 122 and a pivotal motion of a double-sided printing inversion flapper 123. Then, image formation is performed on a second surface of the sheet, and then the sheet is discharged onto the discharge tray 121.

Sheets are also contained in a second add-on sheet feed cassette 125 (sheet feeder) and a third add-on sheet feed cassette 126 (sheet feeder), and therefore sheet feeding can be performed by an add-on cassette second sheet feed roller 127 and an add-on cassette third sheet feed roller 128 as well.

Figure 2:
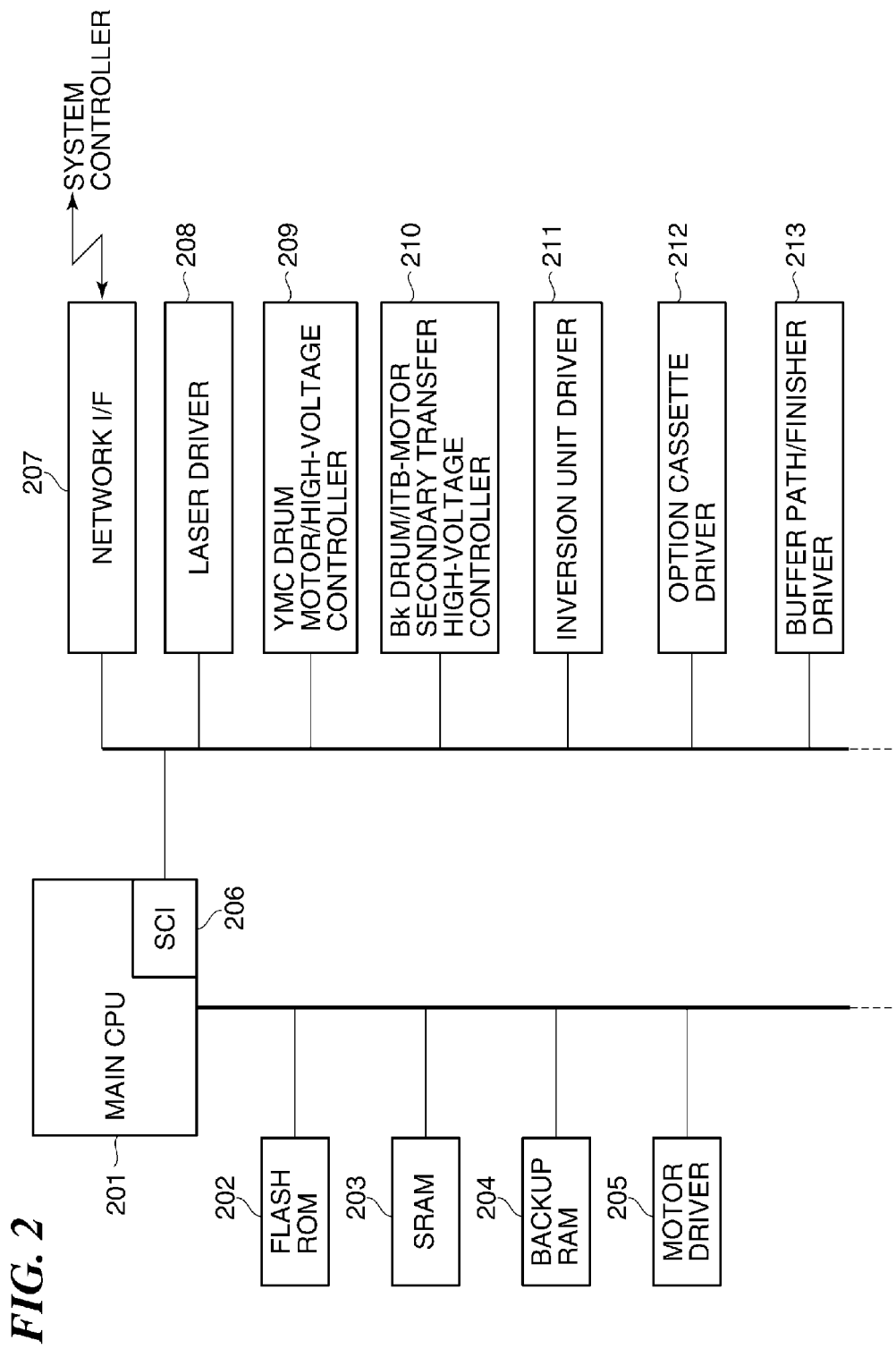
FIG. 2 is a block diagram of the configuration of a main CPU and distributed module controllers of the image forming apparatus.

FIG. 2 is a block diagram of the configuration of a main CPU and distributed module controllers of the image forming apparatus.

Referring to FIG. 2, the main CPU 201 controls the overall operation of the image forming apparatus shown in FIG. 1. A flash ROM 202 stores programs based on which the main CPU 201 operates. A SRAM 203 is used by the main CPU 201 so as to temporarily store data. A backup RAM 204 is a memory that enables storage of information set by the operation of the image forming apparatus even after the power of the image forming apparatus is turned off. The backup RAM 204 is supplied with electric power by a backup battery (not shown).

A motor driver 205 controls rotation of the sheet feed roller 114, the registration roller 115, and so forth. An SCI (Serial Communication Interface) 206 provides serial interface for the main CPU 201 to communicate with interfaces, drivers, various distributed module controllers each connected to the main CPU 201, and so forth, by eight-channel signal lines. The main CPU 201 performs full duplex communication via the channels of the SCI 206 using two signal lines, to thereby control the interfaces, the drivers, and the various distributed module controllers.

A network interface (I/F) 207 provides interface for connection to a system controller that supplies an input image signal. A laser diver 208 controls the laser scanner units 104*y*, 104*m*, 104*c*, and 104*k*. A YMC drum motor/high-voltage controller 209 performs control of a photosensitive drum drive motor included in each of the process units 101*y*, 101*m*, and 101*c*, and high voltage control for charging, development, and primary transfer.

A Bk drum/ITB (Intermediate Transfer Belt) motor secondary transfer high-voltage controller 210 performs control of a photosensitive drum drive motor included in the process unit 101*k*, high voltage control for charging, development, and primary transfer, control of a drive motor for the intermediate transfer member 108, and high voltage control for secondary transfer by the secondary transfer roller 110. A inversion unit driver 211 controls rotation of the double-sided printing inversion drive roller 122 and the double-sided printing refeed drive roller 124 and pivotal motion of the double-sided printing inversion flapper 123.

An option cassette driver 212 controls rotation of the add-on cassette second sheet feed roller 127 of the second add-on sheet feed cassette 125 and rotation of the add-on cassette third sheet feed roller 128 of the third add-on sheet feed cassette 126. A buffer path/finisher driver 213 is configured to control a buffer path unit 150 and the finisher 160. The buffer path/finisher driver 213 controls rotation of a buffer path conveying roller 151 and upward and downward motion of a finisher upper tray 161 and a finisher lower tray 162 (discharge section).

Figure 3:
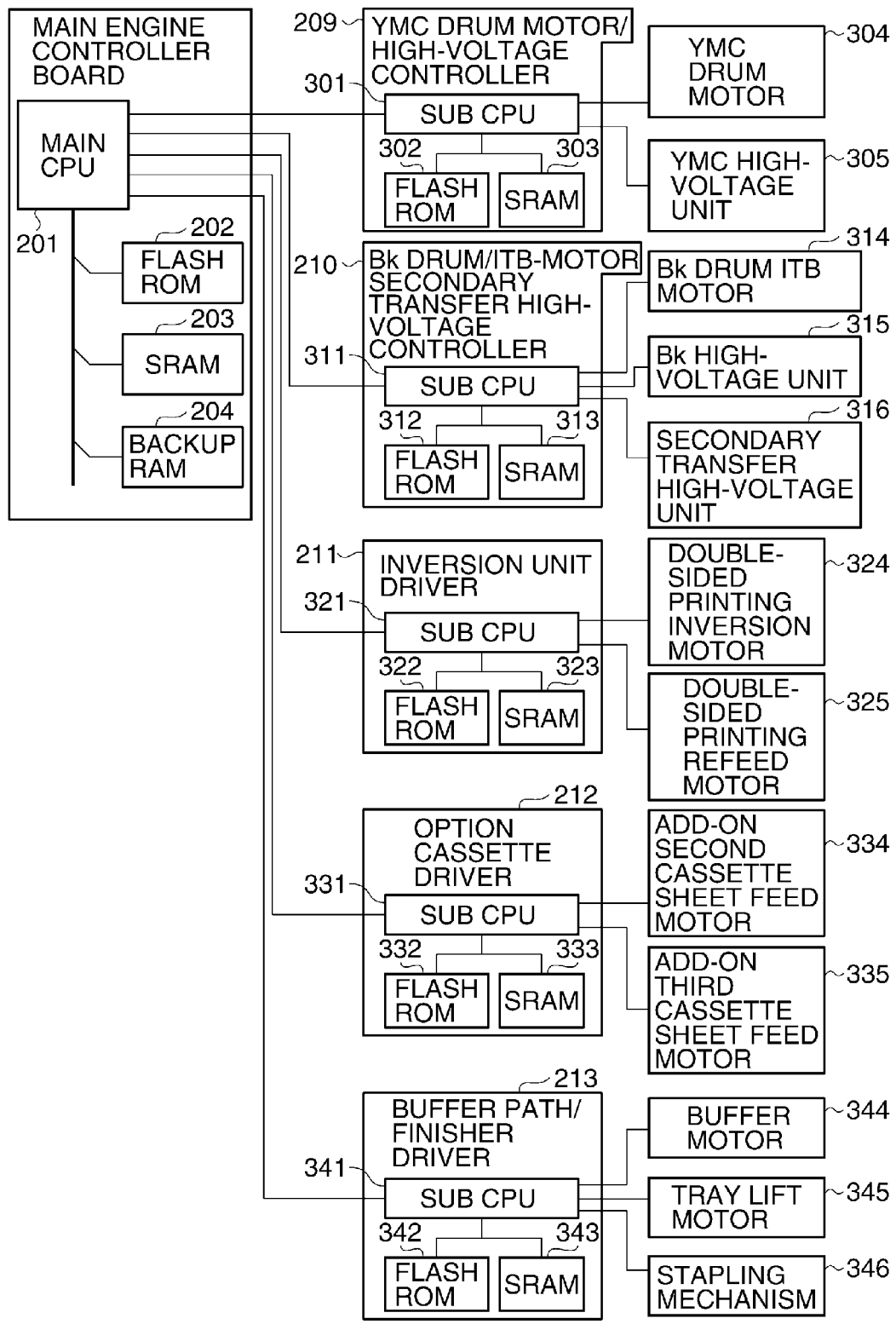
FIG. 3 is a block diagram of the detailed configuration of the main CPU and the distributed module controllers.

FIG. 3 is a block diagram of the detailed configuration of the main CPU and the distributed module controllers.

As shown in FIG. 3, the main CPU 201 and the distributed module controllers (the YMC drum motor/high-voltage controller 209 to the buffer path/finisher driver 213) are connected by serial signal lines. Each of the distributed module controllers includes a sub CPU (microprocessor) and a flash ROM (storage unit) storing an associated control program. In the following, a detailed description will be given of the configuration.

The YMC drum motor/high-voltage controller 209 includes a sub CPU 301 for performing control, a flash ROM 302 storing a control program for controlling the sub CPU 301, and a SRAM 303 for use as a work area for operation of the sub CPU 301. The sub CPU 301 controls a YMC drum motor 304 and a YMC high-voltage unit 305. The board name of the YMC drum motor/high-voltage controller 209 is YMC Drum Driver board.

The Bk drum/ITB motor secondary transfer high-voltage controller 210 includes a sub CPU 311 for performing control, a flash ROM 312 storing a control program for controlling the sub CPU 311, and a SRAM 313 for use as a work area for operation of the sub CPU 311. The sub CPU 311 controls a Bk drum ITB (Intermediate Transfer Belt) motor 314, a Bk high-voltage unit 315, and a secondary transfer high-voltage unit 316. The board name of the Bk drum/ITB motor secondary transfer high-voltage controller 210 is Bk-ITB Drum Driver board.

The inversion unit driver 211 includes a sub CPU 321 for performing control, a flash ROM 322 storing a control program for controlling the sub CPU 321, and a SRAM 323 for use as a work area for operation of the sub CPU 321. The sub CPU 321 controls a double-sided printing inversion motor 324 and a double-sided printing refeed motor 325. The board name of the inversion unit driver 211 is Double-Sided Printing Inversion Motor Driver Board.

The option cassette driver 212 includes a sub CPU 331 for performing control, a flash ROM 332 storing a control program for controlling the sub CPU 331, and a SRAM 333 for use as a work area for operation of the sub CPU 331. The sub CPU 331 controls an add-on second cassette sheet feed motor 334 and an add-on third cassette sheet feed motor 335. The board name of the option cassette driver 212 is Add-on Cassette Sheet Feed Motor Driver board.

The buffer path/finisher driver 213 includes a sub CPU 341 for performing control, a flash ROM 342 storing a control program for controlling the sub CPU 341, and a SRAM 343 for use as a work area for operation of the sub CPU 341. The sub CPU 341 controls a buffer motor 344 for driving the buffer path conveying roller 151, a tray lift motor 345 for lifting up and down the finisher upper tray 161 and the finisher lower tray 162, and a stapling mechanism 346 provided in the finisher 160. The board name of the buffer path/finisher driver 213 is Buffer Path/Finisher Driver board.

Figure 4:
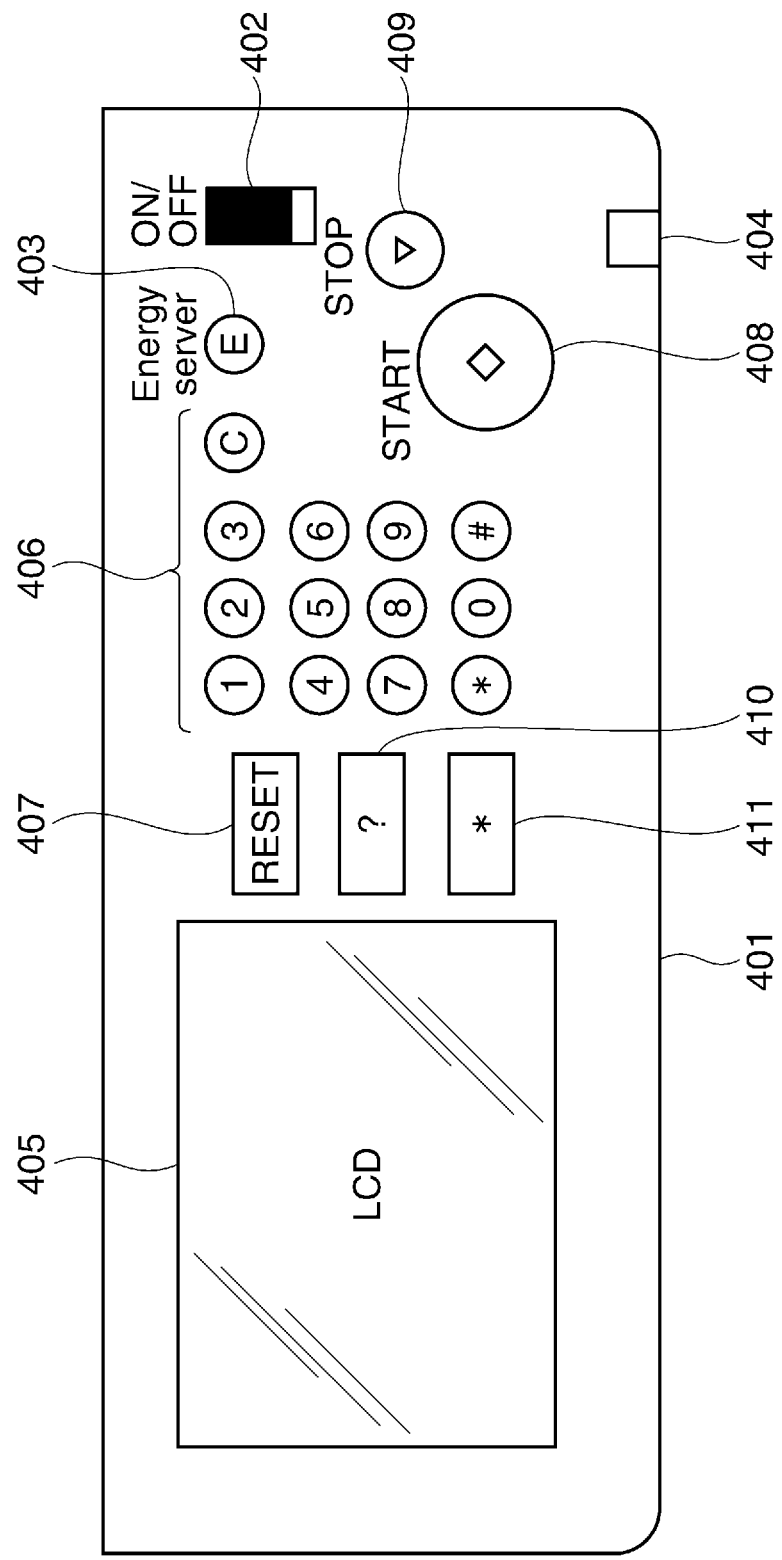
FIG. 4 is a view of a console section of the image forming apparatus.

FIG. 4 is a view of a console section of the image forming apparatus.

As shown in FIG. 4, the console section 401 includes a switch, various buttons, various keys, and a display section. A power switch 402 is operated to turn on/off a main power supply for supplying power to a power supply unit, not shown. A power saving button 403 is operated to shift the image forming apparatus to a predetermined power saving mode. A power LED 404 is illuminated in green when the main power supply is on. Further, when a function associated with an operation by a user is in operation, the power LED 404 flashes on and off in green. When some error or the like occurs, the power LED 404 is illuminated in red to notify the user of the abnormality.

A liquid crystal display section 405 is implemented by a touch panel-type TFT dot matrix liquid crystal panel. The liquid crystal display section 405 is equipped with a function of executing operation in each mode provided in the image forming apparatus, a function of displaying the modes, print mode selection buttons, described hereinafter, and so forth, and a function of switching between the modes. A ten-key pad 406 is operated to enter the number of sheets for copying, a FAX transmission destination, and so forth. A reset key 407 is operated to clear entered contents and return a screen to the initial state of a currently selected mode.

A start key 408 is operated to cause the image forming apparatus to actually start an operation, based on contents input via the liquid crystal display section 405 and the ten-key pad 406. A stop key 409 is operated to cancel an operation started by a user's operation of the start key 408, in the middle of the operation. A help key 410 is operated to display an explanatory text for the user on the liquid crystal display section 405. A user mode button 411 is operated to configure settings suitable for the user in advance.

Figure 5:
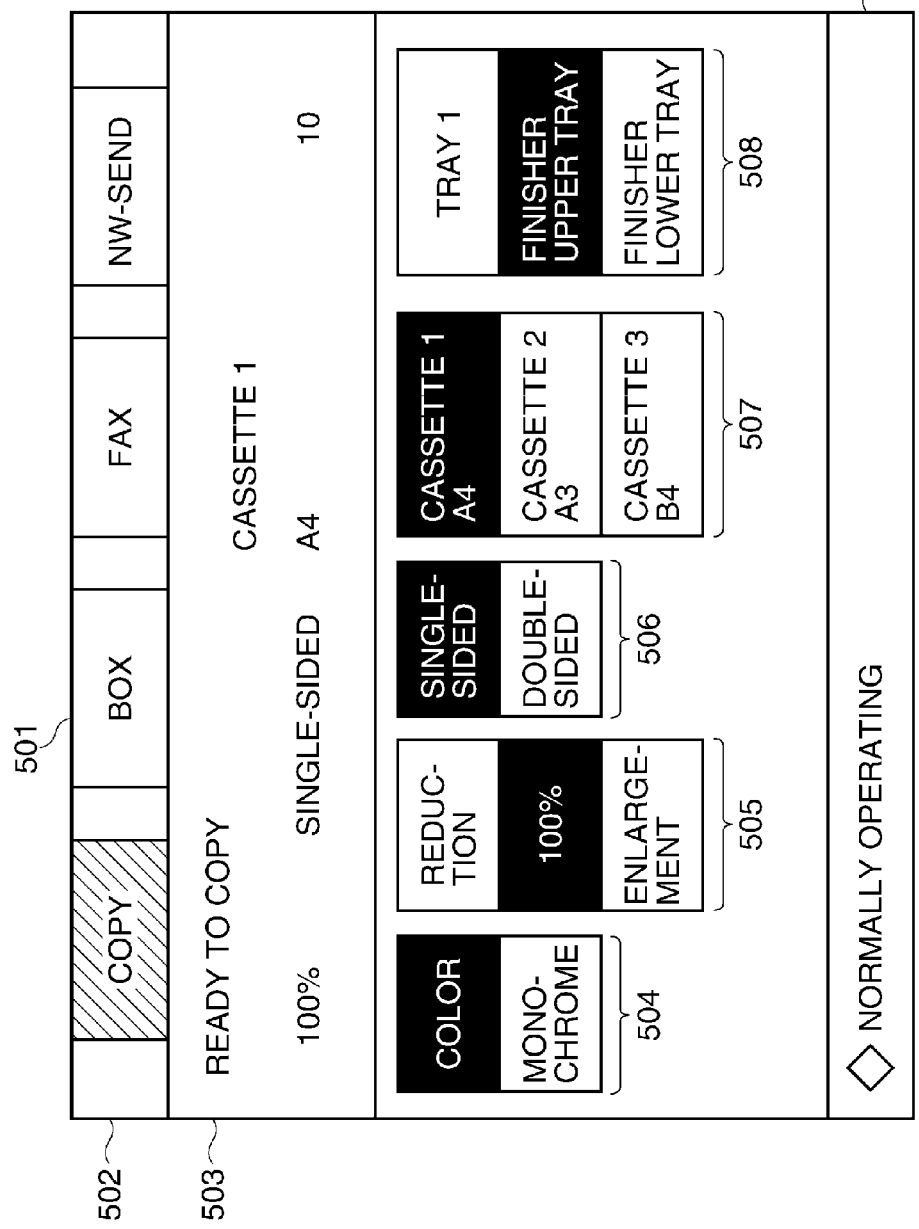
FIG. 5 is a view of a job selection screen displayed on the console section.

FIG. 5 is a view of a job selection screen displayed on the console section.

Referring to FIG. 5, the job selection screen 501 is displayed on the liquid crystal display section 405 of the console section 401 when the image forming apparatus is in a copy mode. A function selection button 502 is operated to display an operation function screen associated with a function key (COPY, BOX, FAX, etc.) touched by the user. When the operation function is switched from one to another, an associated operation function screen is displayed.

In a copy setting display section 503, there are displayed a status indicating whether or not the apparatus is ready to copy, mode settings including a sheet size setting, a copy count set using the ten-key pad 406, and a copy magnification set using a copy magnification selection button 505. A color mode setting section 504 (a color selection button and a monochrome selection button) is operated to set a monochrome mode or a color mode. The copy magnification selection button 505 is operated to set a copy magnification (reduction/100% magnification/enlargement).

A double-sided copy-setting button 506 is operated to set single-sided copying or double-sided copying. A sheet feeder selection button 507 is operated to set a sheet feed cassette to be used. A discharge destination selection button 508 is operated to set a discharge tray to be used for print output. A status display section 511 displays a message indicative of a status in the image forming apparatus.

Figure 6:
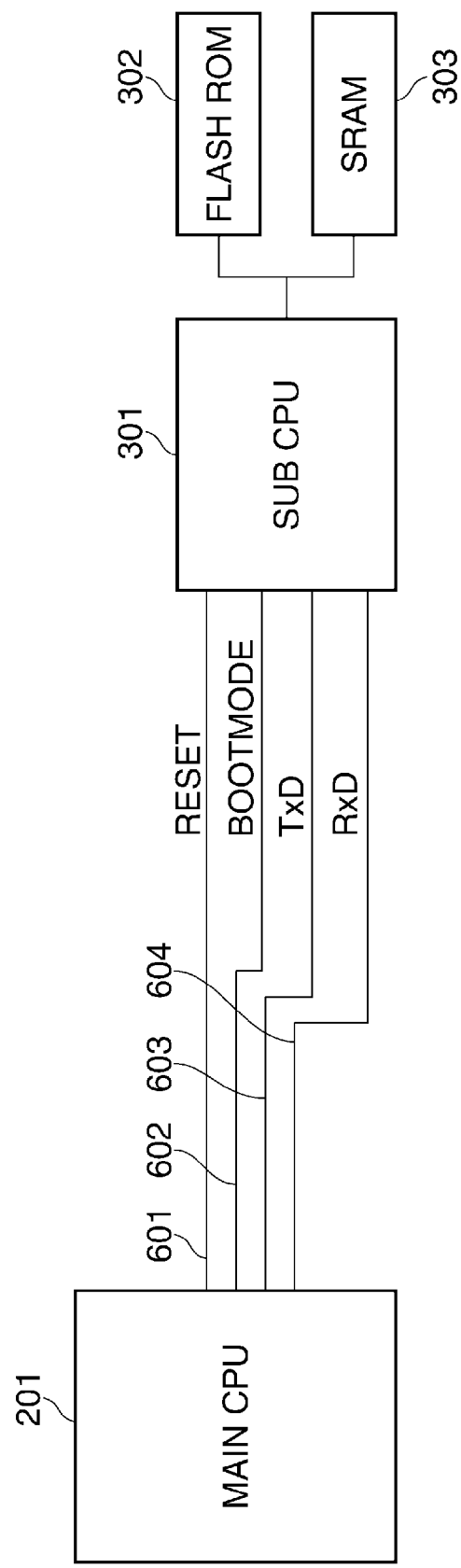
FIG. 6 is a block diagram of the configuration of serial signal lines connecting between the main CPU and a sub CPU of a distributed module controller.

FIG. 6 is a block diagram of the configuration of the serial signal lines connecting between the main CPU and the sub CPU of a distributed module controller.

As shown in FIG. 6, the main CPU 201 and the sub CPU 301 of the YMC drum motor/high-voltage controller 209 are connected to each other by a RESET signal line 601, a BOOT MODE signal line 602, a TxD signal line 603, and a RxD signal line 604. In FIG. 6, the sub CPU 301 of the YMC drum motor/high-voltage controller 209 is taken as an example for the sub CPU of a distributed module controller, illustration and description of the sub CPUs of the other distributed module controllers, which are identical in configuration to the sub CPU 301 of the YMC drum motor/high-voltage controller 209, are omitted.

The RESET signal line 601 has an output on a side toward the main CPU 201 and an input on a side toward the sub CPU 301, and is used by the main CPU 201 for resetting the sub CPU 301 at predetermined timing. The RESET signal line 601 indicates a binary level which is high during operation time and low during reset time.

The BOOT MODE signal line 602 has an output on a side toward the main CPU 201 and an input on a side toward the sub CPU 301. The BOOT MODE signal line 602 is used to determine an operation mode to be executed after the sub CPU 301 is reset and then restarted. The BOOT MODE signal line 602 indicates a binary level which is usually high and low in the firmware update mode.

The TxD signal line 603 is for sending a serial communication signal from the main CPU 201 to the sub CPU 301. Information is asynchronously transferred on an 8-bit basis through the TxD signal line 603 at a TTL (transistor-transistor logic) level.

The RxD signal line 604 is used to send a serial communication signal from the sub CPU 301 to the main CPU 201. Through the RxD signal line 603 as well, information is asynchronously transferred on an 8-bit basis at the TTL level.

Next, a description will be given of the operation of the image forming apparatus according to the present embodiment.

First, taking the sub CPU 301 of the YMC drum motor/high-voltage controller 209 as an example, firmware update therefor will be described in detail with reference to FIGS. 7 to 10.

The flash ROM 302 storing the control program for the sub CPU 301 has a capacity of 32 Kbytes, for example, and writing in the flash ROM 302 is made possible by accessing the same in a predetermined procedure. During update of the control program for the sub CPU 301, a rewriting program itself cannot operate if a program code thereof exists in the flash ROM 302 targeted for update.

For this reason, first of all, it is required to shift to a program mode in which a rewriting program is loaded and operated in the SRAM 303 which is a work area for the sub CPU 301. A description will be given, with reference to FIG. 7, of a mode switching process executed during firmware update.

Figure 7:
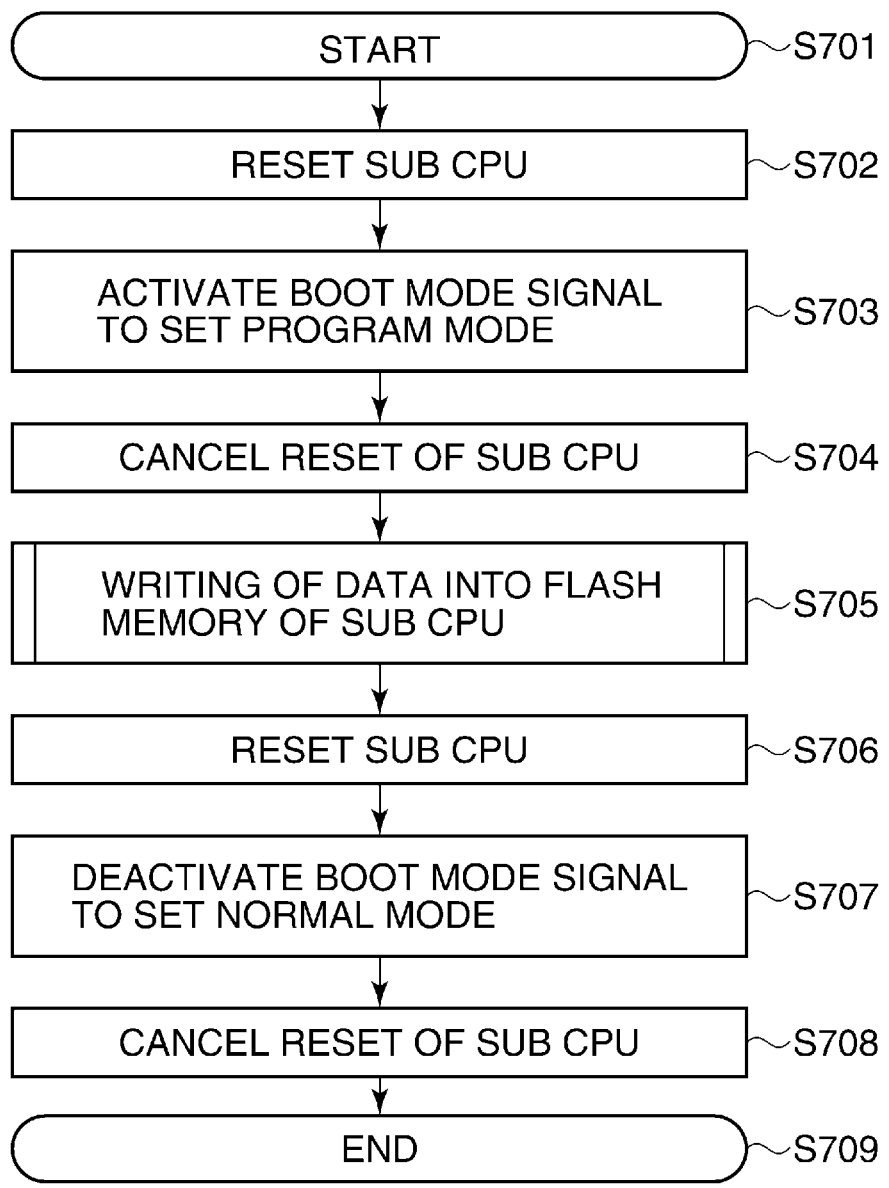
FIG. 7 is a flowchart of a mode switching process executed during firmware update in the image forming apparatus.

FIG. 7 is a flowchart of the mode switching process executed during firmware update in the image forming apparatus.

Referring to FIG. 7, the main CPU 201 starts the firmware update-time mode switching process (step S701) and turns on the RESET signal line 601 of the sub CPU 301 which is a target for firmware update (step S702). Further, the BOOT MODE signal line 602 is activated to set the program mode (step S703).

When the reset of the sub CPU 301 is canceled in a state where the BOOT MODE signal line 602 is active (step S704), the sub CPU 301 is started in the program mode of the flash ROM 302. In the program mode, the sub CPU 301 awaits communication from the TxD signal line 603, loads the rewriting program stored in the flash ROM 302 into the SRAM 303 which is a work memory, and then rewrites the control program (firmware) in the flash ROM 302 (step S705).

Hereafter, communication between the main CPU 201 and the sub CPU 301 and rewriting in the flash ROM 302 of the sub CPU 301 are controlled based on the rewriting program loaded in the SRAM 303. Processing executed in steps S706 to S709 will be described hereinafter with reference to corresponding parts of FIG. 10.

Next, the communication between the main CPU 201 and the sub CPU 301 will be described with reference to FIG. 8.

Figure 8:
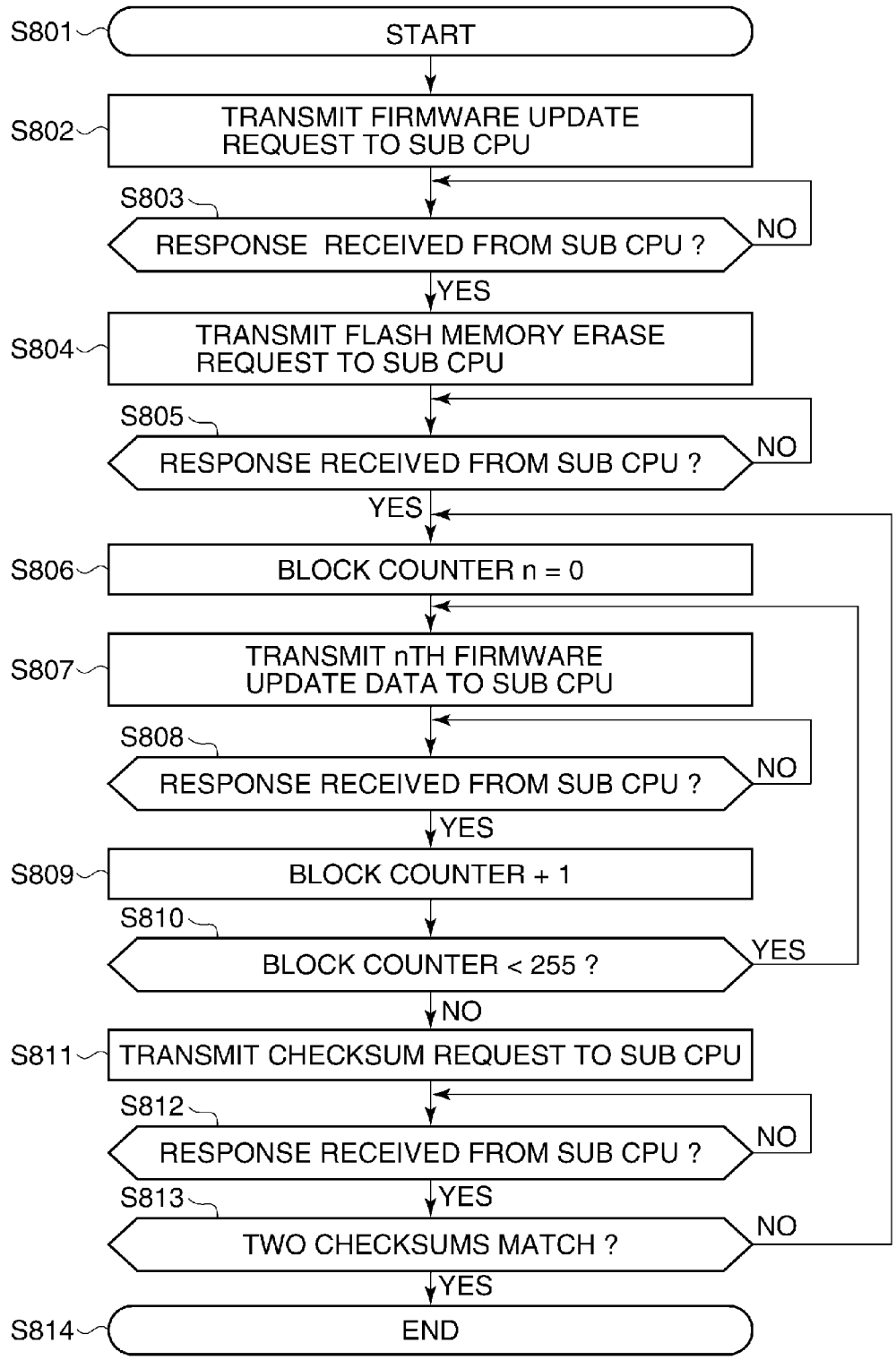
FIG. 8 is a flowchart of a data transmission process executed during firmware update in the image forming apparatus.

FIG. 8 is a flowchart of a data transmission process executed in the step S705 during firmware update in the image forming apparatus.

Referring to FIG. 8, when the data transmission process is started (step S801), the main CPU 201 transmits negotiation information for executing rewriting in the flash ROM 302 provided for the sub CPU 301 to the sub CPU 301 (step S802). More specifically, the main CPU 201 sends a firmware update request to the sub CPU 301. Upon receipt of the firmware update request from the main CPU 201, the sub CPU 301 sends a flash memory rewritable response to the main CPU 201.

The main CPU 201 determines whether or not the flash memory rewritable response has been received from the sub CPU 301 (step S803). The flash memory cannot be directly rewritten, and therefore it is required to execute erase processing prior to rewriting.

Therefore, upon receipt of the flash memory rewritable response from the sub CPU 301, the main CPU 201 sends a flash memory erase request to the sub CPU 301 (step S804). When the sub CPU 301 receives the flash memory erase request from the main CPU 201 and erasing of all blocks of the flash ROM 302 is completed, the sub CPU 301 sends a flash memory erase response to the main CPU 201.

The main CPU 201 determines whether or not the flash memory erase response has been received from the sub CPU 301 (step S805).

Upon receipt of the flash memory erase response from the sub CPU 301, the main CPU 201 sets the value of a block counter for counting block writing to 0 (step S806).

Then, the main CPU 201 divides a firmware image to be written in the flash ROM 302, into parts of e.g. 128 bytes each to thereby generate 256 packets in total, for sequential transmission of the packets from the leading one to the sub CPU 301. The leading one of the divisional packets has a leading marker provided in a header section thereof, and the trailing one of the divisional packets has an end marker provided in a header section thereof. This makes it possible to identify the leading packet by the leading marker to start writing in the flash ROM 302 from the top block of the same, and identify the trailing packet by the end marker.

The main CPU 201 sends a firmware writing request for an nth block (n is an integer within a range of 0 to 255) of the flash ROM 302 and an nth packet (firmware update data) of the 256 packets to the sub CPU 301 (step S807). Naturally, when the step S807 is first executed, the firmware writing request for a first block of the flash ROM 302 and a first packet (firmware update data) are sent to the sub CPU 301.

Upon receipt of the firmware writing request and the packet associated therewith, the sub CPU 301 writes data of the packet into the corresponding block of the flash ROM 302. When writing of the data in the block is completed, the sub CPU 301 sends a block writing completion response to the main CPU 201. The main CPU 201 determines whether or not the block writing completion response has been received from the sub CPU 301 (step S808).

When the block writing completion response has been received from the sub CPU 301, the main CPU 201 increments the value of the block counter by 1 (step S809). Then, the main CPU 201 determines whether the value of the block counter is smaller than 255 (step S810). If the value of the block counter is smaller than 255, the main CPU 201 returns to the step S807 to send the firmware writing request for the next block and the next packet (firmware update data) to the sub CPU 301.

Thus, the sub CPU 301 repeatedly carries out writing of firmware data in the flash ROM 302. When the sub CPU 301 sequentially receives the 256 packets in total from the main CPU 201 and the update of all the blocks of the flash ROM 302 is completed, the firmware update is terminated.

When the sub CPU 301 has sequentially received the 256 packets in total and has completely updated all the blocks of the flash ROM 302 as described above, the value of the block counter is equal to 255, and hence the answer to the question of the step S810 becomes negative (NO), so that the main CPU 201 proceeds to a step S811, wherein the main CPU 201 sends a checksum acquisition request to the sub CPU 301 (step S811). As a checksum, there are used the least significant 16 bits of each of values obtained by adding up the respective values of odd addresses and even addresses of the whole area of the flash ROM 302.

Upon receipt of the checksum acquisition request from the main CPU 201, the sub CPU 301 sends a response notifying the main CPU 201 of the respective checksum values of the odd addresses and the even addresses to the main CPU 201. The main CPU 201 determines whether or not the respective checksum values of the odd addresses and the even addresses have been received as a response (step S812).

When the respective checksum values of the odd addresses and the even addresses have been received as a response, the main CPU 201 makes a comparison between checksum values stored in advance in the main CPU 201 and the checksum value of the odd addresses and that of the even addresses received from the sub CPU 301, to thereby determine whether or not the received value and the stored value of each of the two types of checksums match (step S813).

If the received value and the stored value of each of the two checksums do not match, it is determined that information on the flash ROM 302 does not match information on the firmware image sent from the main CPU 201 to the sub CPU 301. Therefore, to perform retry control, the main CPU 201 generates packets by dividing the firmware image to be written in the flash ROM 302, into parts of e.g. 128 bytes each to thereby generate packets, and sequentially transmits again the packets from the leading one to the sub CPU 301.

If the received value and the stored value of each of the two checksums match, the main CPU 201 determines that firmware update in the flash ROM 302 of the sub CPU 301 has been normally completed, and terminates the firmware update process (step S814).

Next, with reference to FIG. 9, a more detailed description will be given of requests and responses in communication between the main CPU 201 and the sub CPU 301 during the firmware update process described with reference to FIG. 8.

Figure 9:
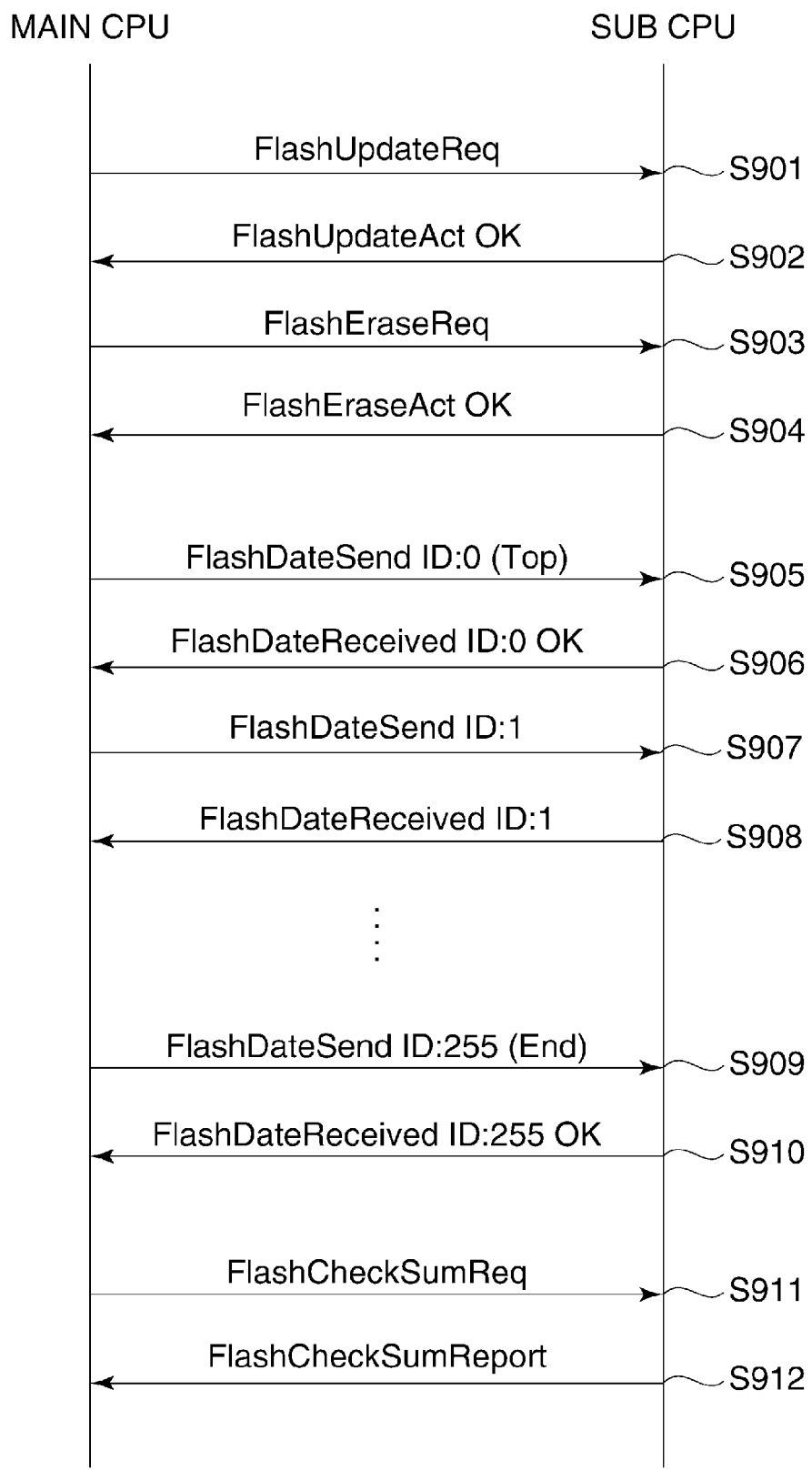
FIG. 9 is a diagram of a communication sequence executed during firmware update in the image forming apparatus.

FIG. 9 is a diagram of a communication sequence executed during firmware update in the image forming apparatus.

Referring to FIG. 9, first, the main CPU 201 transmits the negotiation information (step S901). In response to this, the sub CPU 301 transmits the flash memory rewritable response (step S902).

Then, the main CPU 201 transmits the flash memory erase request (step S903). After erasing of all the blocks of the flash ROM 302 is completed, the sub CPU 301 transmits the flash memory erase response (step S904).

Hereafter, the main CPU 201 sequentially transmits packets of the firmware image, starting with one for a first block indicated by ID=0. That is, first, the main CPU 201 sends a first packet indicated by ID=0 for the first block (step S905). When writing of data of the sent packet in the block is completed, the sub CPU 301 transmits the block writing completion response (step S906).

Further, the main CPU 201 increments the value of the block counter by 1, and then transmits a packet, indicated by ID=1, of the firmware image for the next block (step S907). In this case as well, when writing of data of the packet in this block is completed, the sub CPU 301 transmits the block writing completion response (step S908).

After repeatedly carrying out the above-mentioned operation, the main CPU 201 finally transmits a packet, indicated by ID=255, of the firmware image for a last block (step S909). When the sub CPU 301 completes writing of data of the firmware image in the last block and then transmits the block writing completion response (step S910), the firmware update process is terminated.

Finally, the main CPU 201 sends the checksum acquisition request to the sub CPU 301 (step S911). The sub CPU 301 calculates each checksum and sends the calculated checksum values to the main CPU 201 (step S912). The checksum processing is performed as described with reference to the steps S811 to S813 in FIG. 8.

Figure 10:
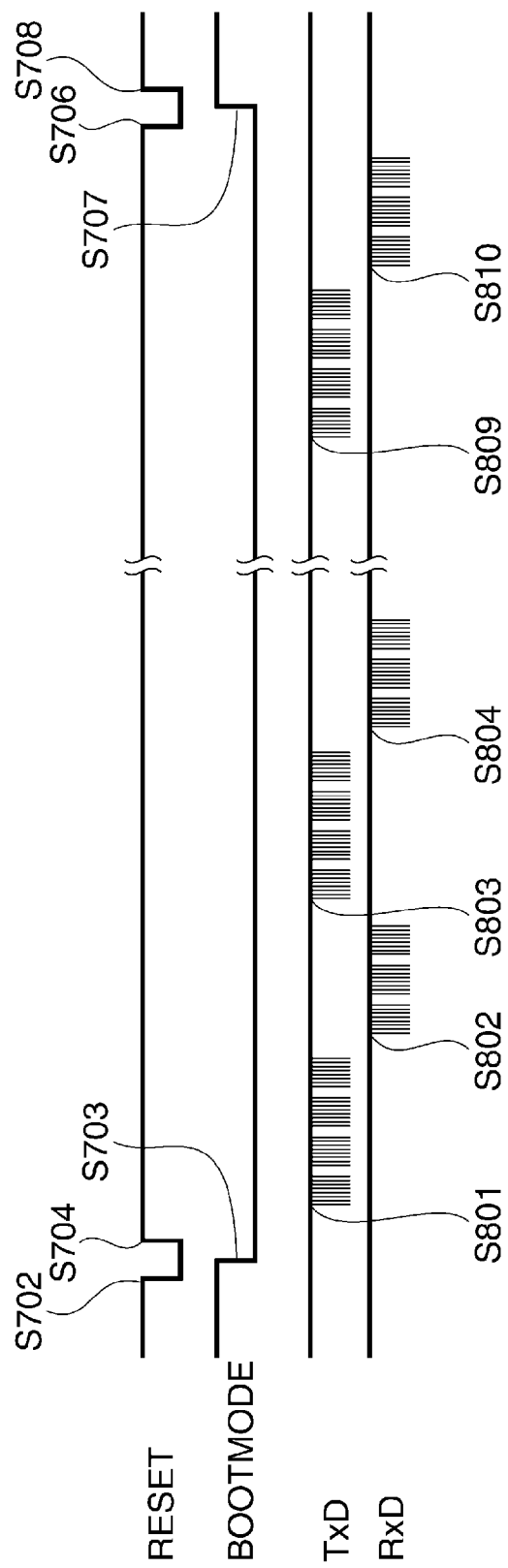
FIG. 10 is a timing diagram illustrating waveforms of respective communication signals output during the firmware update in the image forming apparatus.

During execution of the firmware update for the flash ROM 302 of the sub CPU 301, the RESET signal line 601, the BOOT MODE signal line 602, the TxD signal line 603, and the RxD signal line 604 take respective communication waveforms illustrated in FIG. 10.

FIG. 10 is a timing diagram illustrating the waveforms of respective communication signals generated during the firmware update in the image forming apparatus.

Referring to FIG. 10, S702 to S708 added together with respective leader lines indicating points on the waveforms of the RESET signal line 601 and the BOOT MODE signal line 602 correspond to the steps having the same step numbers in FIG. 7. Further, S801 to S810 added together with respective leader lines indicating points on the waveforms of the TxD signal line 603 and RxD signal line 604 correspond to the steps having the same step numbers in FIG. 8.

When firmware update for the flash ROM 302 of the sub CPU 301 is completed, the main CPU 201 resets the sub CPU 301 once (step S706). Further, the main CPU 201 deactivates the BOOT MODE signal line 602, i.e. sets the same to the H level to set the normal mode (step S707) and then cancels the reset of the sub CPU 301 (step S708). This completes the mode switching process in FIG. 7 (step S709). When the above-described process is executed, the sub CPU 301 starts execution of a new program written in the flash ROM 302.

As described with reference to FIG. 3, the main CPU 201 is connected to the sub CPUs 301, 311, 321, 331, and 341 by different sets of serial signal lines, respectively. Therefore, the main CPU 201 can simultaneously communicate with the sub CPUs 301, 311, 321, 331, and 341.

Consequently, even when any of the sub CPUs is under firmware update, the main CPU 201 can continue its operation. However, it is required to determine which sub CPU is under firmware update and has its function disabled, and hence the main CPU 201 holds a sub CPU firmware update status table, shown in FIGS. 11A to 11D, in the SRAM 203.

FIGS. 11A to 11D are views of the sub CPU firmware update status table.

Referring to FIGS. 11A to 11D, the sub CPU firmware update status table 1101 stores information on respective items of Module 1101, Status 1107, and Remain 1108. Reference numerals 1102 to 1106 indicate respective sub CPUs (Modules) each shown with its status under the columns of Status 1107 and Remain 1108.

Reference numeral 1102 indicates the status of the sub CPU 301 of the YMC drum motor/high-voltage controller (shown as YMC Drum Controller) 209. Reference numeral 1103 indicates the status of the sub CPU 311 of the Bk drum/ITB motor secondary transfer high-voltage controller (shown as Bk Drum/ITB Controller) 210. Reference numeral 1104 indicates the status of the sub CPU 331 of the option cassette driver (shown as Option Cassette Driver) 212. Reference numeral 1105 indicates the status of the sub CPU 321 of the inversion unit driver (shown as Reverse/ReFeed Driver) 211. Reference numeral 1106 indicates the status of the sub CPU 341 of the buffer path/finisher driver (shown as Buffer Path/Finisher driver) 213.

The status of the sub CPU of each of the controllers 209 to 213 is indicated by Active or Updating, as shown in the Status column 1107. Remaining update size information on the sub CPU of each of the controllers 209 to 213 is stored as shown in the Remain column 1108. The remaining update size information is information indicative of the remaining size of a control program, which is to be sent from the main CPU 201 to the sub CPU as a target for firmware update, i.e. information (update remaining information) indicative of the remaining amount of update for the control program as an update target.

For example, FIG. 11A shows that the sub CPU 301 of the YMC drum motor/high-voltage controller (YMC Drum Controller) 209 and the sub CPU 321 of the inversion unit driver (Reverse/ReFeed Driver) 211 are under firmware update.

FIG. 11B shows that the sub CPU 331 of the option cassette driver (Option Cassette Driver) 212 and the sub CPU 341 of the buffer path/finisher driver (Buffer Path/Finisher Driver) 213 are under firmware update.

FIG. 11C shows that the sub CPU 321 of the inversion unit driver (Reverse/ReFeed Driver) 211 and the sub CPU 341 of the buffer path/finisher driver (Buffer Path/Finisher Driver) 213 are under firmware update.

FIG. 11D shows that only the sub CPU 301 of the YMC drum motor/high-voltage controller (YMC Drum Controller) 209 is under firmware update.

Next, a description will be given of characteristic control of the image forming apparatus of the present embodiment.

Now, how console section display information is updated during firmware update for one of the sub CPUs 301, 311, 321, 331, and 341 of the image forming apparatus will be described with reference to FIGS. 12 to 14.

Figure 12:
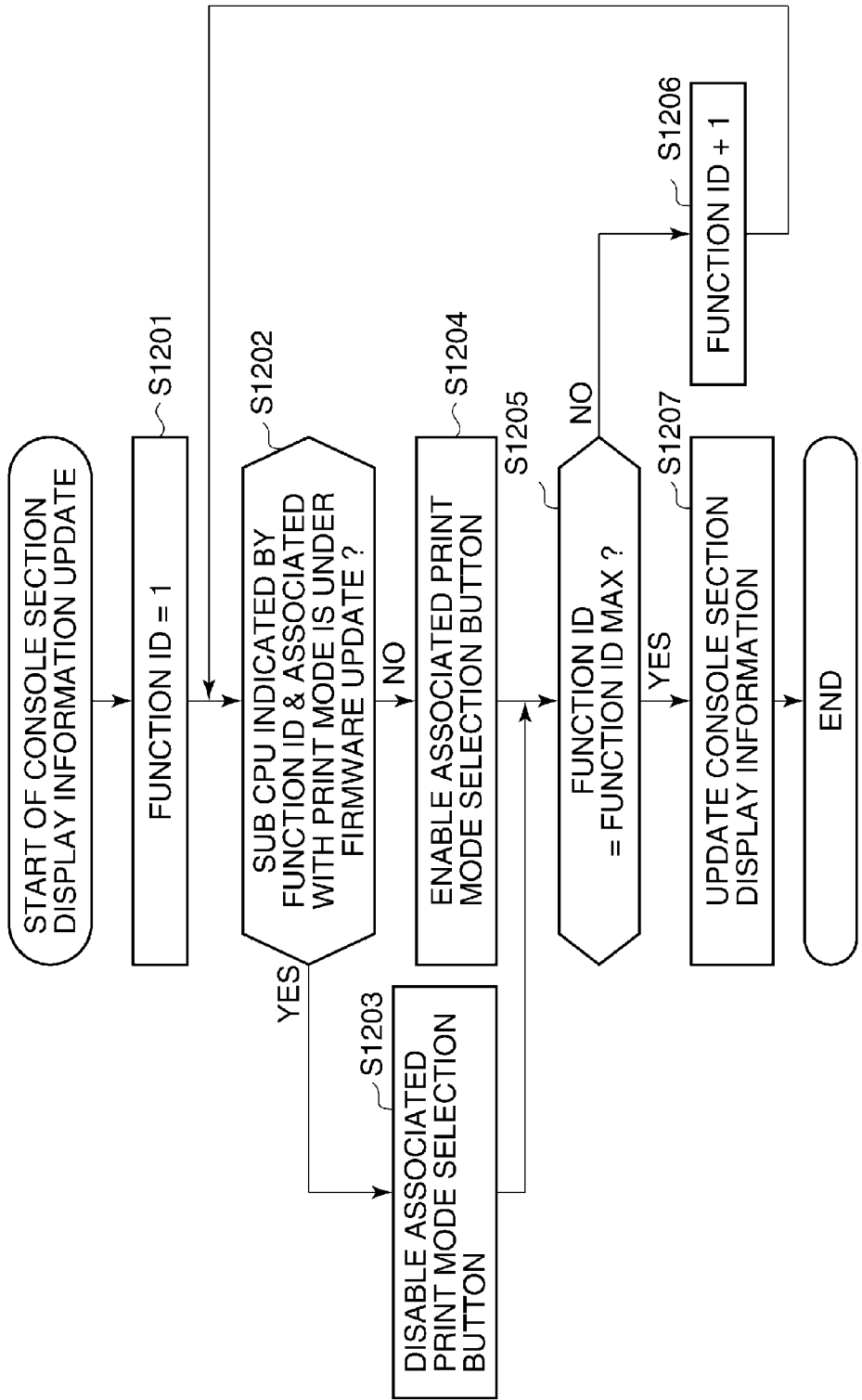
FIG. 12 is a flowchart of a console section display information update process executed by the image forming apparatus.

FIG. 12 is a flowchart of a console section display information update process.

Referring to FIG. 12, the console section display information update process is executed by the main CPU 201 at time intervals of e.g. 500 msec. so as to update information to be displayed on the screen of the liquid crystal display section 405 of the console section 401. After starting the console section display information update process, the main CPU 201 sets a function ID (see FIG. 13) to 1 (step S1201) so as to sequentially determine on the items of the print function of the image forming apparatus whether each of them can be executed.

FIG. 13 is a view of a function ID-sub CPU association table.

Referring to FIG. 13, the function ID-sub CPU association table 1301 stores information on respective items of function ID, functional Classification, option, and in-use sub CPU. The item of Function Classification has four functional classifications of sheet feeder ID, color mode, single-sided/double-sided, and discharge destination ID. The functional classification "sheet feeder ID" has options of the sheet feed cassette 113 (cassette 1), the second add-on sheet feed cassette 125 (cassette 2), and the third add-on sheet feed cassette 126 (cassette 3). The functional classification "color mode" has options of monochrome printing and color printing. The functional classification "single-sided/double-sided" has options of single-sided printing and double-sided printing. The functional classification "discharge destination ID" has options of the discharge tray 121 (tray 1), the finisher upper tray 161, and the finisher lower tray 162.

Note that the function ID-sub CPU association table 1301 is recorded in advance in the flash ROM 202 based on product configuration information of the image forming apparatus. However, the function ID-sub CPU association table 1301 may be generated based on module connection information acquired when the product of the image forming apparatus is started up, and be recorded in the SRAM 203.

Referring again to FIG. 12, the main CPU 201 refers to the FIG. 13 function ID-sub CPU association table 1301 to acquire in-use sub CPU information associated with a current function ID, and compares the acquired in-use sub CPU information with sub CPU status information in the sub CPU firmware update status table 1101 shown in FIGS. 11 to 11D. Further, the main CPU 201 determines whether or not a sub CPU indicated by the function ID and associated with a print mode is under firmware update (indicated by Updating in the Status 1107) (step S1202).

If the sub CPU indicated by the function ID and associated with the print mode is under firmware update, the main CPU 201 disables an associated print mode selection button on the screen of the liquid crystal display section 405 of the console section 401 (step S1203). If the sub CPU indicated by the function ID and associated with the print mode is not under firmware update, the main CPU 201 enables the associated print mode selection button on the screen of the liquid crystal display section 405 of the console section 401 (step S1204).

Then, to sequentially check all of the function IDs provided for the image forming apparatus in FIG. 13, the main CPU 201 checks whether or not the function ID has reached a function ID max (step S1205). If the function ID has not reached the function ID max, the main CPU 201 increments the function ID by 1 (step S1206), and then re-executes the step S1202 et seq.

The function ID max is a value indicative of the maximum number of function IDs, and in the function ID-sub CPU association table 1301 in FIG. 13, the function ID max is equal to 11. When the function ID reaches the function ID max, the main CPU 201 updates the console section display information based on results of determination thus obtained (step S1207), followed by terminating the present process.

Figure 14:
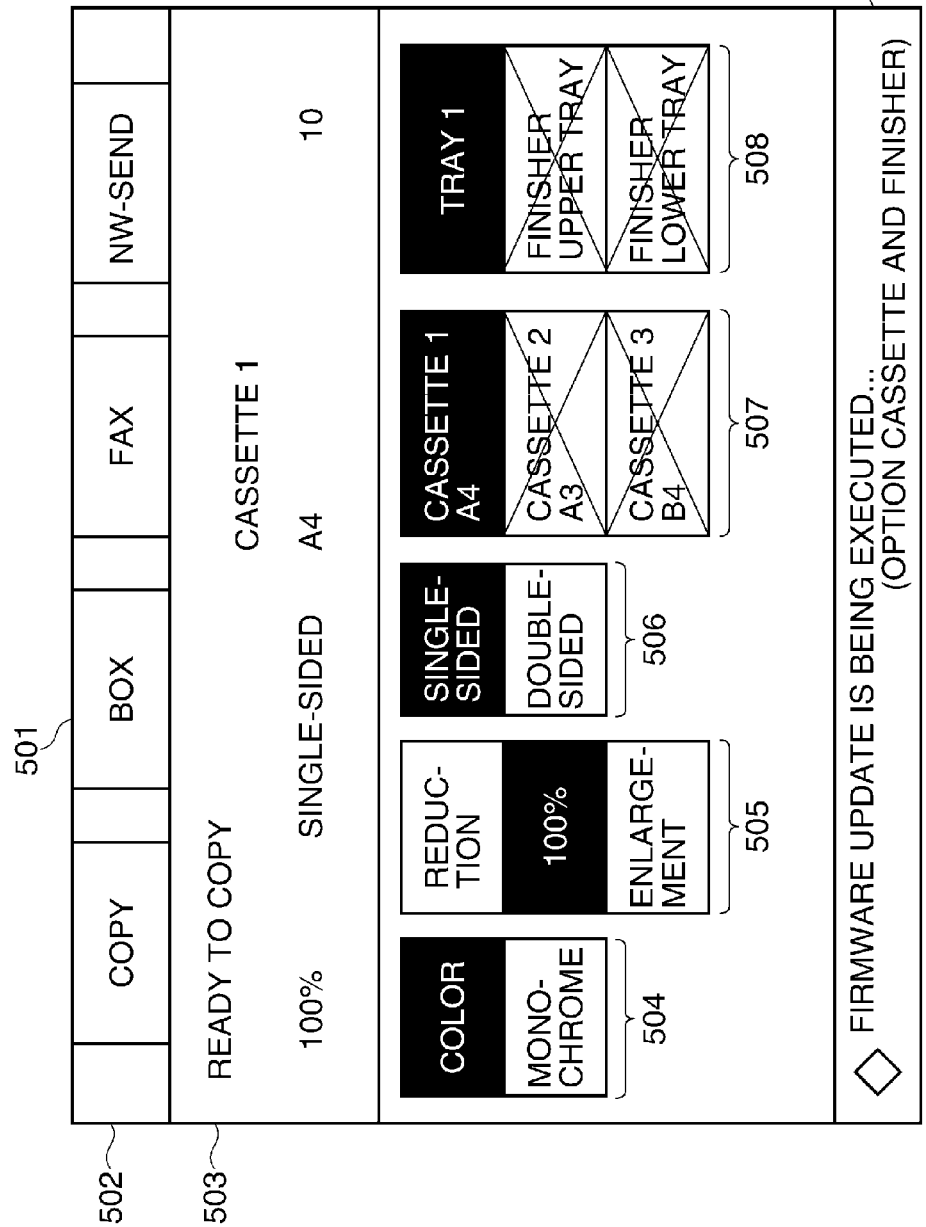
FIG. 14 is a view of a job selection screen displayed on the console section during firmware update.

The results of determination as to whether to enable or disable each of the print mode selection buttons are reflected as illustrated in FIG. 14.

FIG. 14 is a view of a job selection screen displayed on the console section.

As for sheet feeder selection (from a sheet feeder indicated by function ID 2=cassette 2 and a sheet feeder indicated by function ID 3=cassette 3, in FIG. 13), when the sub CPU firmware update status table 1101 is in a state shown in FIG. 11B where the sub CPU 331 and the flash ROM 332 of the option cassette driver 331 are under update, it is determined that the selection is to be disabled. In this case, as shown in FIG. 14, cassette 2 and cassette 3 in the sheet feeder selection button 507 are made unselectable by being grayed out (crossed out in FIG. 14). In this state, depression of cassette 2 or cassette 3 in the sheet feeder selection button 507 on the liquid crystal display section 405 (touch panel) of the console section 401 is not accepted.

As for discharge destination selection (from a finisher upper tray indicated by function ID 10 or a finisher lower tray indicated by function ID 11, in FIG. 13), when the sub CPU firmware update status table 1101 is in a state shown in FIG. 11B where the sub CPU 341 and the flash ROM 342 of the buffer path/finisher driver 213 are under update, it is determined that the selection is to be disabled. In this case, as shown in FIG. 14, finisher upper tray and finisher lower tray in the discharge destination selection button 508 are made unselectable by being grayed out (crossed out in FIG. 14). In this state, depression of finisher upper tray and finisher lower tray in the discharge destination selection button 508 on the liquid crystal display section 405 (touch panel) of the console section 401 is not accepted.

As described above, according to the present embodiment, during execution of firmware update in the image forming apparatus, out of all selectable functions for use in an image forming job, functions requiring the use of sub CPUs controlled by firmware targeted for update are disabled. This makes it possible to start an image forming job or continue execution of the image forming job even during firmware update in the image forming apparatus, to thereby achieve reduction of downtime during the use of the image forming apparatus.

Next, a second embodiment of the present invention will be described. The second embodiment is distinguished from the first embodiment in points described hereafter with reference to FIGS. 15 to 17. The other elements in the present embodiment are identical to the corresponding ones in the first embodiment (FIGS. 1 to 6), and therefore description thereof is omitted.

Next, a description will be given of characteristic control of the image forming apparatus, according to the present embodiment.

A case where a print job (image forming job) is executed during firmware update in the image forming apparatus will be described with reference to FIGS. 15 to 17.

FIG. 15 is a view of a print mode information table stored in the image forming apparatus.

Referring to FIG. 15, the print mode information table 1501 stores print mode information on respective items of sheet feeder ID 1502, color mode 1503, single side/double-side designation 1504, discharge destination ID 1505, and post-processing mode 1506. In a case where a print job is input to the image forming apparatus, data of the print job includes print mode information. In general, the image forming apparatus determines a printing operation determined based on the print mode information.

In the sub CPU firmware update status table 1101 shown in FIG. 11C and described hereinabove, the status, indicated by reference numeral 1105, of the sub CPU of the inversion unit driver 211 and the status, indicated by reference numeral 1106, of the sub CPU 341 of the buffer path/finisher driver 213 indicate that the two sub CPUs are under firmware update. The following description of a print mode final determination process shown in FIG. 16 is given assuming that a job is input in this state of the image forming apparatus, by way of example.

Figure 16:
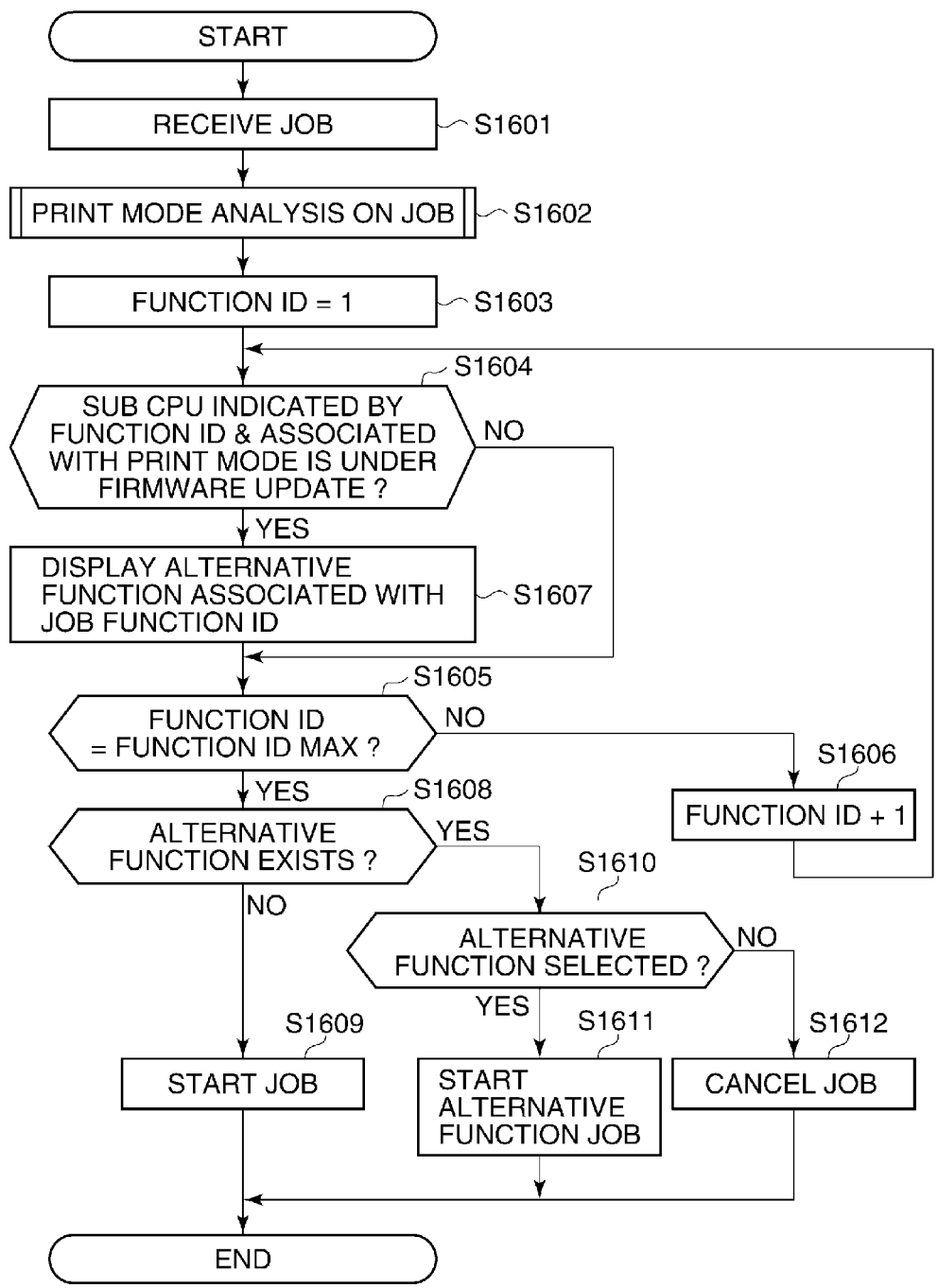
FIG. 16 is a flowchart of a print mode final determination process executed by the image forming apparatus.

FIG. 16 is a flowchart of the print mode final determination process executed by the image forming apparatus.

Referring to FIG. 16, first, the main CPU 201 receives a print job (image forming job) input to the image forming apparatus (step S1601). Then, the main CPU 201 performs print mode analysis on the received print job and extracts the print mode information shown in FIG. 15 (step S1602).

Next, the main CPU 201 initializes the function ID (counter function ID) (step S1603) so as to sequentially check whether or not the print functions of the image forming apparatus can be used, based on the print mode information extracted by the print mode analysis. According to FIG. 13, function ID=1 indicates that sheet feeder ID corresponds to cassette 1, and this matches the print mode of the received print job.

The above-mentioned print functions include those (e.g. printing using cassette 1, monochrome printing, single-sided printing, printing using tray 1, etc.) each associated with functional classifications in FIG. 13 (sheet feeder ID, color mode, single-sided/double-sided, and discharge destination ID).

Then, the main CPU 201 determines whether or not a sub CPU associated with a function ID corresponding to the print mode extracted by the print mode analysis is under firmware update (step S1604). Since it can be determined from the in-use sub CPU information in FIG. 13 that the function ID=1 does not use any sub CPU, which means that there is no associated sub CPU under firmware update, it is not required to select an alternative function.

Then, to sequentially check all of the function IDs, the main CPU 201 checks whether or not the function ID has reached the function ID max (step S1605). If the function ID has not reached the function ID max, the main CPU 201 increments the function ID by 1 (step S1606), and then checks a print mode associated with the next function ID (step S1604).

In the course of sequentially checking the print modes while incrementing the function ID by 1, it is determined from the functional classification information in FIG. 13 that the function ID=8 corresponds to designation of double-sided printing and matches the print mode information extracted by the print mode analysis. According to the in-use sub CPU information in FIG. 13C, the sub CPU 321 of the inversion unit driver 211 is used for the function ID=8, and according to the sub CPU firmware update status table in FIG. 11A, the sub CPU 321 is under firmware update.

Therefore, the main CPU 201 selects single-sided printing associated with the function ID=7, which does not use the sub CPU 321 of the inversion unit driver 211, as an alternative function which is selectable in designating the same functional classification "single-sided/double-sided", and displays single-sided printing as an alternative function on the liquid crystal display section 405 of the console section 401 (step S1607).

Similarly, in the course of sequentially checking the print modes while incrementing the function ID by 1, it is determined from the functional classification information in FIG. 13 that the function ID=10 corresponds to designation of finisher upper tray and matches the print mode information extracted by the print mode analysis. According to the in-use sub CPU information in FIG. 13, the sub CPU 341 of the buffer path/finisher driver 213 is used for the function ID=10, and according to the sub CPU firmware update status table in FIG. 11C, the sub CPU 341 is under firmware update.

Therefore, the main CPU 201 selects tray 1 associated with function ID=9, which does not use the sub CPU 341 of the buffer path/finisher driver 213, as an alternative function, and displays tray 1 as an alternative function on the liquid crystal display section 405 of the console section 401.

The main CPU 201 sequentially checks the print modes in association with the respective function IDs as described above. Then, when the function ID has reached the function ID max (Yes to the step S1605), the main CPU 201 finally determines whether or not there is any alternative function required to be used (step S1608).

Figure 17:
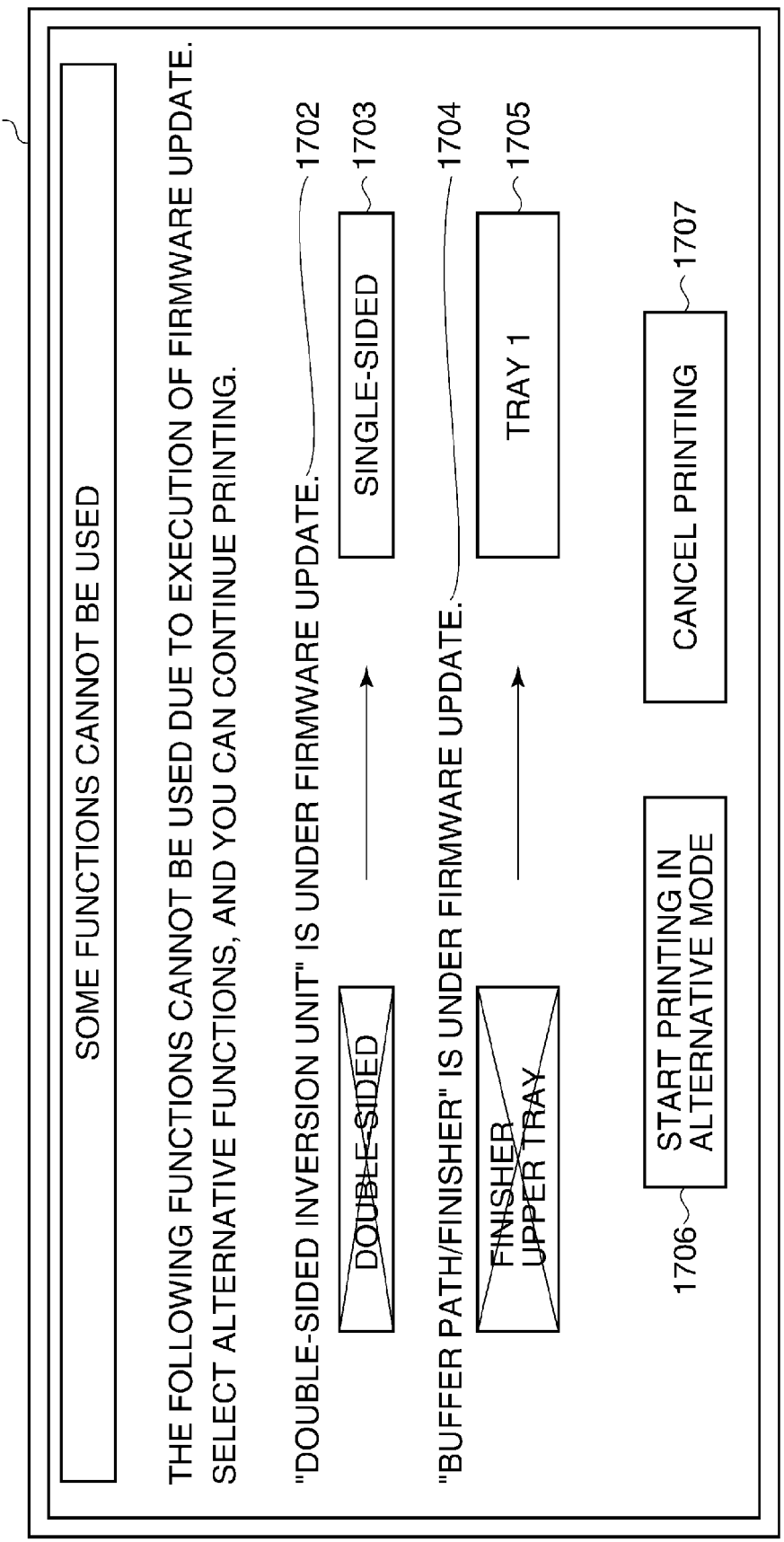
FIG. 17 is a view of an alternative function selection screen displayed on a console section.

If no alternative function is required to be used, the main CPU 201 immediately starts the print job (step S1609), whereas if there is any alternative function is required to be used, the main CPU 201 displays an alternative function selection screen, shown in FIG. 17, on the liquid crystal display section 405 of the console section 401 to thereby prompt the user to select the alternative function (step S1610).

FIG. 17 is a view of the alternative function selection screen displayed on the console section.

Referring to FIG. 17, the alternative function selection screen (alternative print mode selection dialog) 1701 is used for notification of functions currently unavailable and advising selection of alternative functions. Reference numerals 1702 and 1704 denote messages displayed to notify the user of the functions that cannot be used due to execution of firmware update.

More specifically, the message 1702 on the alternative function selection screen 1701 indicates that since the sub CPU 321 of the inversion unit driver 211 is under firmware update, it is impossible to use the print mode for a double-sided print job in which printing is performed on both sides of a sheet. The message 1704 indicates that since the sub CPU 341 of the buffer path/finisher driver 213 is under firmware update, it is impossible to use the print mode in which the discharge destination is set to the finisher upper tray.

An alternative function selection button 1703 is operated to select a single-sided job as an alternative function for a double-sided job. An alternative function selection button

1705 is operated to select output to tray 1 (discharge tray 121) as an alternative function for sheet output to the finisher upper tray. An alternative printing start button 1706 is operated to decide to start printing in the alternative mode selected by the alternative function selection buttons 1703 and 1705. A printing stop button 1707 is operated to decide to stop printing without using the alternative mode.

Referring again to FIG. 16, when the user selects the alternative functions on the alternative function selection screen 1701 and operates the alternative printing start button 1706, the main CPU 201 starts the print job using the alternative functions (step S1611). On the other hand, when the user operates the printing stop button 1707 on the alternative function selection screen 1701 without using any alternative function, the main CPU 201 stops execution of the print job (step S1612). Thus, the present process is terminated.

The above-described control makes it possible to start a print job by selecting an alternative function designated by a user even if the image forming apparatus is executing firmware update, to thereby achieve reduction of downtime during the use of the image forming apparatus.

As described above, according to the present embodiment, during execution of firmware update in the image forming apparatus, a function, which does not need to use a sub CPU controlled by firmware targeted for update, of the functions selectable for use in an image forming job is selected and displayed as an alternative function. This makes it possible to start an image forming job or continue execution of the image forming job by selecting the alternative function designated by a user even during firmware update in the image forming apparatus, to thereby achieve reduction of downtime during the use of the image forming apparatus.

Next, a third embodiment of the present invention will be described. The third embodiment is distinguished from the first embodiment in points described hereafter with reference to FIGS. 18 and 19. The other elements in the present embodiment are identical to the corresponding ones in the first embodiment (FIGS. 1 to 6), and therefore description thereof is omitted.

Next, a description will be given of characteristic control of the image forming apparatus, according to the present embodiment.

Now, a description will be given of how a print mode is selected when a remaining firmware update amount (remaining firmware information transfer time) is small during firmware update for the sub CPU 301 in the image forming apparatus, with reference to FIGS. 18 and 19.

Figure 18:
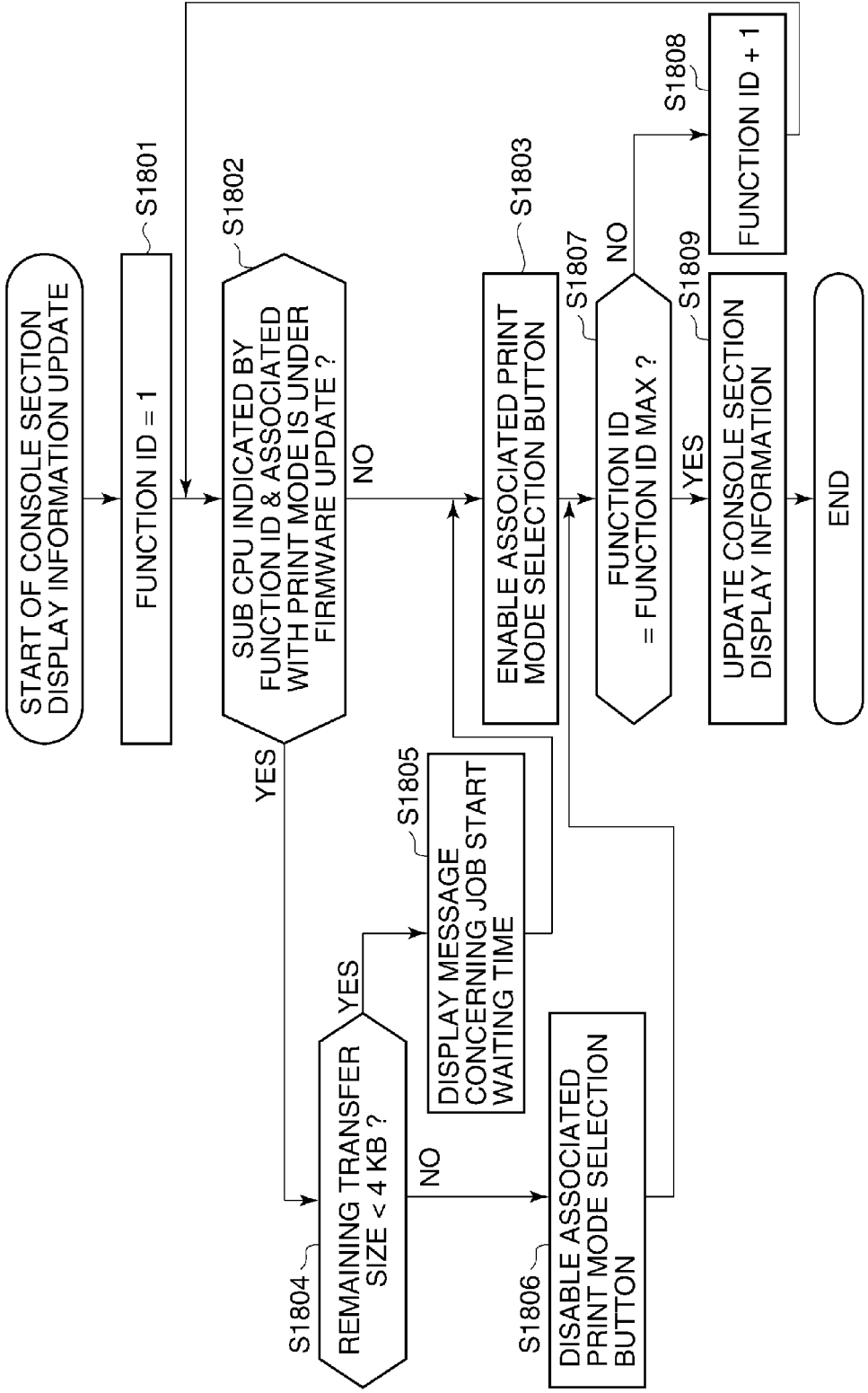
FIG. 18 is a flowchart of a console section display information update process executed by an image forming apparatus according to a third embodiment of the present invention.

FIG. 18 is a flowchart of a console section display information update process executed by the image forming apparatus, according to the present embodiment.

Referring to FIG. 18, the console section display information update process is executed by the main CPU 201 at time intervals of e.g. 500 msec. so as to update information to be displayed on the screen of the liquid crystal display section 405 of the console section 401. When the console section display information update process is started, the main CPU 201 sets the function ID (see FIG. 13) to 1 so as to sequentially check the print function items one by one to determine whether or not a function associated with the function ID is executable (step S1801).

Next, the main CPU 201 refers to the function ID-sub CPU association table 1301 in FIG. 13 to acquire in-use sub CPU information associated with the function ID, and compares the acquired in-use sub CPU information with sub CPU status information in the sub CPU firmware update status table 1101 shown in FIGS. 11 to 11D. Further, the main CPU 201 determines whether or not a sub CPU indicated by the function ID and associated with a print mode is under firmware update (indicated by Updating in the Status 1107) (step S1802).

If the sub CPU indicated by the function ID and associated with the print mode is not under firmware update, the main CPU 201 enables an associated print mode selection button on the screen of the liquid crystal display section 405 of the console section 401 (step S1803).

On the other hand, if the sub CPU indicated by the function ID and associated with the print mode is under firmware update, the main CPU 201 evaluates the remaining update size information on the sub CPUs indicated by Remain 1108 in the sub CPU firmware update status table 1101 in FIGS. 11A to 11D. Then, the main CPU 201 determines whether or not the remaining update size information indicated by Remain 1108 in the sub CPU firmware update status table 1101 (holding unit), i.e. the value of the remaining transfer size is smaller than 4 KB (below a predetermined value) (step S1804). The remaining transfer size is the remaining size of a control program to be transferred from the main CPU 201 to a sub CPU targeted for firmware update.

If the remaining update size information 1108 is smaller than 4 KB, it can be considered that the firmware update will be completed soon, and therefore the main CPU 201 displays a message to the effect that it will take several seconds before the job starts, on the liquid crystal display section 405 of the console section 401 (step S1805). Further, the main CPU 201 enables the associated print mode selection button on the screen of the liquid crystal display section 405 of the console section 401 (step S1803).

If the remaining update size information 1108 is not smaller than 4 KB, it can be considered that it will take longer before completion of the firmware update, and therefore the main CPU 201 disables the associated print mode selection button on the screen of the liquid crystal display section 405 of the console section 401 (step S1806).

Then, to sequentially check all of the function IDs in FIG. 13 provided for the image forming apparatus, the main CPU 201 checks whether or not the function ID has reached the function ID max (step S1807). If the function ID has not reached the function ID max, the main CPU 201 increments the function ID by 1 (step S1808), and then re-executes the step S1802 et seq. When the function ID reaches the function ID max, the main CPU 201 updates the console section display information based on results of determination thus obtained (step S1809), followed by terminating the present process.

Note that in the above-described second embodiment, when a sub CPU is under firmware update and the value of the remaining transfer size is smaller than 4 KB, a function which does not need to use the sub CPU under firmware update may not be displayed as an alternative function.

Figure 19:
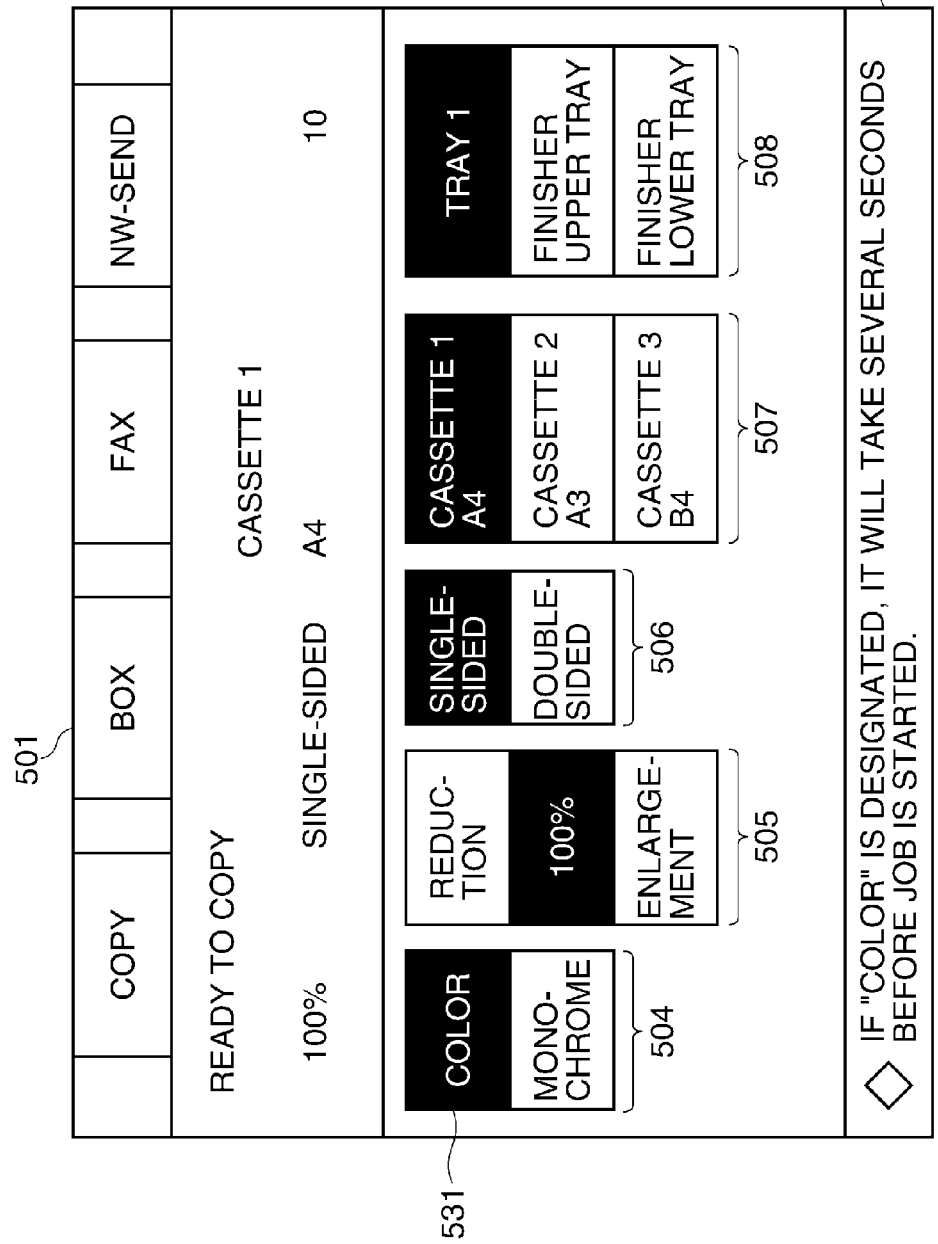
FIG. 19 is a view of a job selection screen displayed on a console section.

The results of determination as to whether to enable or disable each of the print mode selection buttons are reflected as illustrated in FIG. 19.

FIG. 19 is a view of a job selection screen displayed on the console section. Note that the following description is given assuming that a job is input in a state of the image forming apparatus indicated by the sub CPU firmware state update table 1101 shown in FIG. 11D, of by way of example.

Referring to FIG. 19, the job selection screen 501 is displayed on the liquid crystal display section 405 of the console section 401. According to the function ID-sub CPU association table 1301 in FIG. 13, the color mode setting section 504 is associated with the sub CPU 301 of the YMC drum motor/high-voltage controller 209. Further, according to the sub CPU firmware update status table 1101 in FIG. 11D, the sub CPU 301 of the YMC drum motor/high-voltage controller 209 is under firmware update, and the remaining transfer size thereof is 3072 bytes.

Since the remaining transfer size is smaller than 4 KB, it is judged that the firmware update for the sub CPU will be completed soon. As a consequence, a color selection button 531 of the color mode setting section 504 on the job selection screen 501 is normally displayed without being grayed out, but a message is also displayed in a section 532 of the job selection screen 501 to the effect that it takes time corresponding to the remaining firmware update time, i.e. several seconds before the job starts.

As described above, according to the present embodiment, when the remaining firmware update amount (remaining transfer size) is smaller than a predetermined value, out of the functions selectable for use in an image forming job is enabled, a function which uses a sub CPU controlled by firmware targeted for update. This makes it possible to achieve further reduction of downtime during the use of the image forming apparatus while sustaining the functions of the image forming apparatus.

Next, a fourth embodiment of the present invention will be described. The fourth embodiment is distinguished from the first embodiment in points described hereafter with reference to FIGS. 20 and 21. The other elements in the present embodiment are identical to the corresponding ones in the first embodiment (FIGS. 1 to 6), and therefore description thereof is omitted.

Next, a description will be given of characteristic control of the image forming apparatus, according to the present embodiment.

Now, a description will be given of a process executed in a case where the image forming apparatus starts a print job during firmware update and the firmware update is completed during execution of the print job, with reference to FIGS. 20 and 21.

When a print job is started, a sub CPU associated with some functions required to execute the print job is under firmware update, and the print job is started by designating an alternative print mode. In doing this, it is sometimes desirable, when the firmware update is completed, to return the alternative print mode to an original print mode (operation mode) set before being switched to the alternative print mode. The state where a sub CPU associated with some functions required to execute the print job is under firmware update corresponds e.g. to a state where out of the options of cassettes 1, 2, and 3 provided for the functional classification of sheet feeder ID, as shown in FIG. 13, the sub CPU associated with cassette 2 is under firmware update.

Figure 20:
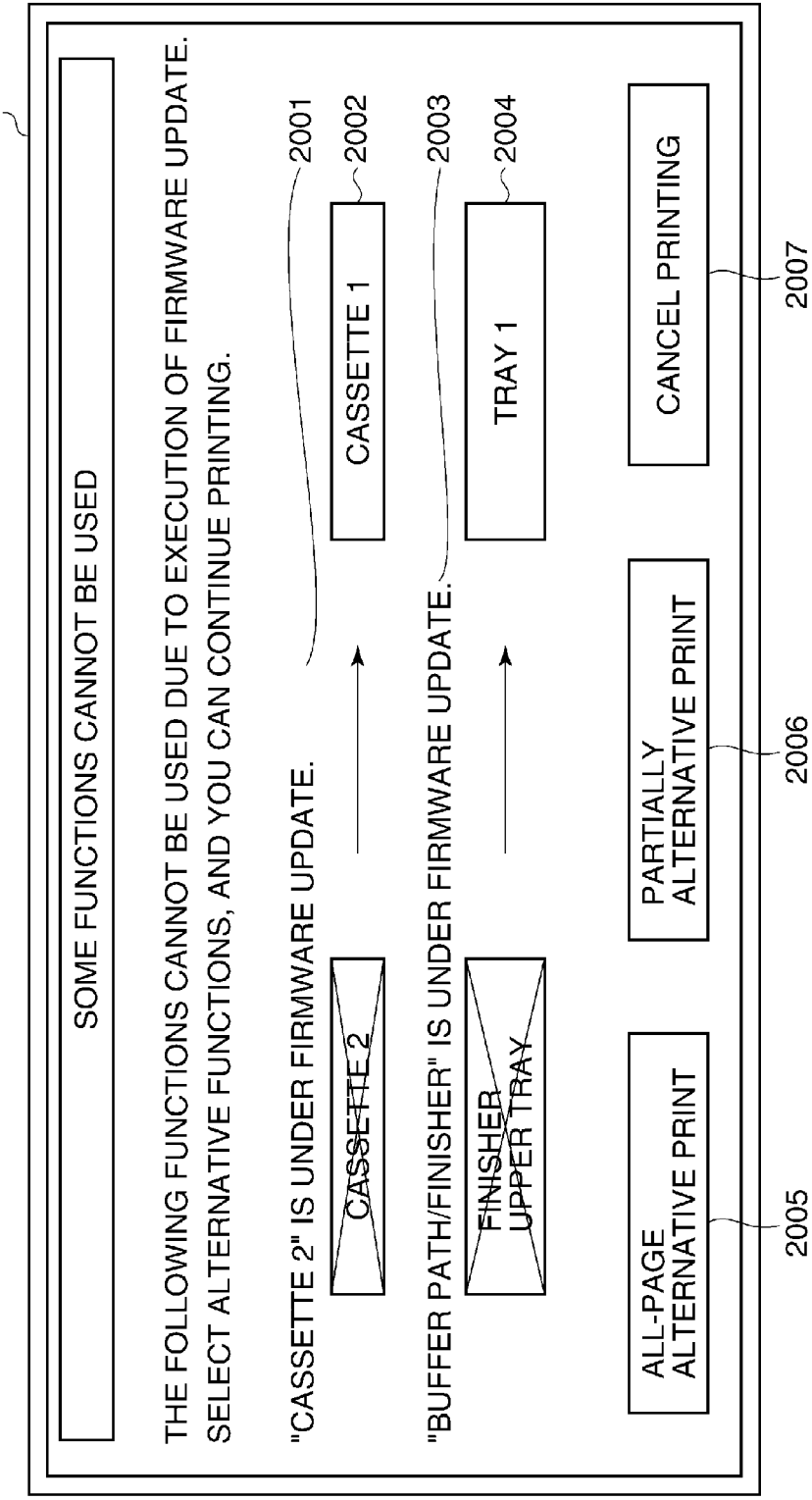
FIG. 20 is a view of an alternative function selection screen displayed on a console section of an image forming apparatus according to a fourth embodiment of the present invention.

FIG. 20 is a view of an alternative function selection screen displayed on the console section of the image forming apparatus, according to the present embodiment.

Referring to FIG. 20, a message 2001 on the alternative function selection screen 1701 indicates that since the sub CPU 331 of the option cassette driver 212 for drivingly controlling cassette 2 is under firmware update, it is impossible to use cassette 2. A display 2002 indicates that cassette 1 can be selected as a sheet feeder to be used in the alternative print mode.

A message 2003 indicates that since the sub CPU 341 of the buffer path/finisher driver 213 for drivingly controlling the finisher upper tray is under firmware update, it is impossible to use finisher upper tray. A display 2004 indicates that tray 1 can be selected as a discharge destination to be used in the alternative print mode.

To start the print job using the alternative print mode, if an all-page alternative print start button 2005 is pressed, the entire print job is executed in the alternative print mode, whereas if a partially alternative print start button 2006 is pressed, the print job is executed midway through in the alternative print mode, and the alternative print mode is switched to an originally designated print mode upon completion of the firmware update. If a print cancel button 2007 is pressed, printing is stopped without executing the print job in the alternative print mode.

A description will be given, with reference to FIG. 21, of an alternative print mode determination process executed during execution of a job when the partially alternative print start button 2006 is pressed.

Figure 21:
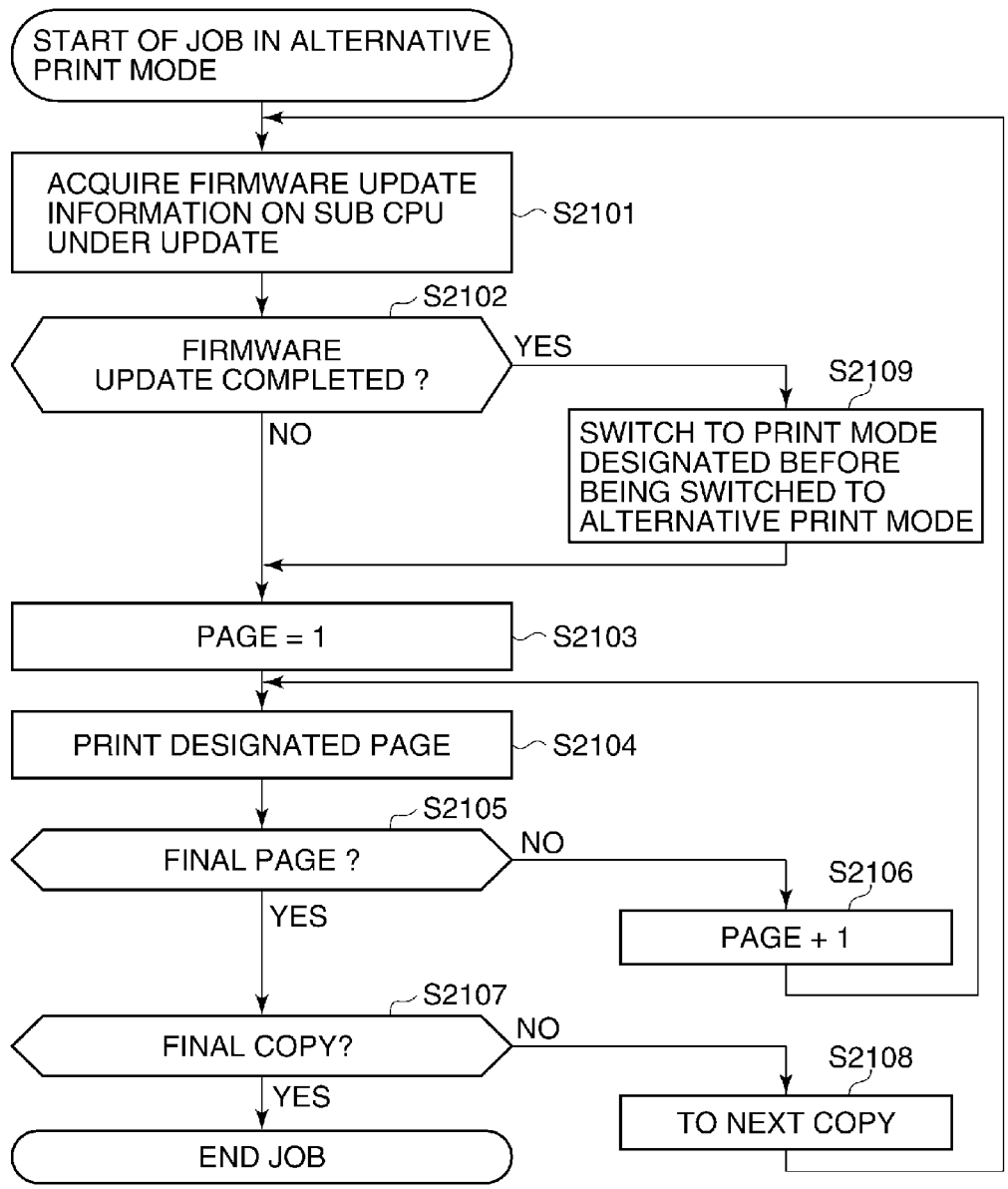
FIG. 21 is a flowchart of an alternative print mode determination process executed during execution of a job by the image forming apparatus.

FIG. 21 is a flowchart of the alternative print mode determination process executed during job execution in the image forming apparatus.

Referring to FIG. 21, when the partially alternative print start button 2006 is pressed to thereby start a midway-through alternative (partially alternative) print job, the main CPU 201 acquires firmware update information on any sub CPU being updated (step S2101). Then, the main CPU 201 evaluates, based on the acquired firmware update information, whether or not the firmware update for the sub CPU has been completed (step S2102).

If the firmware update for the sub CPU has not been completed, the main CPU 201 sets a page number to 1 before starting to print copies the number of which is set for printing (step S2103) and then starts printing of the copies using the image forming section 101 starting with a first page (page number=1) (step 1204). Whenever one page is printed, the main CPU 201 determines whether or not the final page has been reached (step S2105). If the final page has not been reached, the CPU 201 increments the page number by (step S2106). Then, the process returns to the step S2104, and a next page is printed using the image forming section 101.

When the final page has been reached, the main CPU 201 determines whether or not the printed copy is a final one (step S2107). If the printed copy is not a final one, the print job proceeds to a next copy (step S2108). In order to cause the image forming section 101 to print the next copy from the first page, the main CPU 201 returns the process to the step S2102 and acquires firmware update information on the currently updated sub CPU again.

Further, the main CPU 201 determines whether or not the firmware update for the sub CPU has been completed (step S2102). If the firmware update for the sub CPU has been completed, the main CPU 201 switches the alternative print mode to a print mode (operation mode) designated before being switched to the alternative print mode (mode switch) (step S2109) and then starts printing the copy to be printed from its first page.

As described above, according to the present embodiment, when firmware update is completed during execution of an image forming job in an operation mode using an alternative function due to the firmware update in progress, the operation mode is switched back to an original operation mode designated before being switched to the alternative mode. As a consequence, the user can obtain a print product, using the updated firmware, from the middle of the image forming job. This makes it possible to achieve reduction of downtime during the use of the image forming apparatus to thereby make the most of the performance of the same.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-252667 filed Nov. 18, 2011, which is hereby incorporated by reference herein in its entirety.

What is claimed is:

1. An image forming apparatus comprising:
a plurality of microprocessors;
a plurality of storage units storing control programs respectively provided in association with the plurality of microprocessors;
an update unit configured to update the control programs stored in the respective storage units;
a selection unit configured to enable manual selection of functions to be used in an image forming job caused to be executed by the image forming apparatus; and
a control unit configured to control, during execution of update of a control program targeted for update by said update unit, the selection unit so as to prevent selection of a function which uses a microprocessor associated with the control program targeted for update, and so as to enable selection of a function which does not use the microprocessor associated with the control program targeted for update.

2. The image forming apparatus according to claim 1, further comprising a holding unit configured to hold remaining update amount information indicative of a remaining amount of update of the control program targeted for update, and
wherein during execution of update of the control program targeted for update by said update unit, when the remaining amount of update of the control program targeted for update indicated by the remaining update amount information held by said holding unit is smaller than a predetermined value, said control unit enables the function which uses a microprocessor associated with the control program targeted for update.

3. The image forming apparatus according to claim 1, wherein the functions to be used in the image forming job include a function of designating one of a plurality of sheet feeders provided in the image forming apparatus, for sheet feed, a function of designating one of single-sided printing in which image formation is performed on a single side of a sheet and double-sided printing in which image formation is performed on both sides of the sheet, and a function of designating one of a plurality of discharge sections provided in the image forming apparatus, as a sheet discharge destination where the sheet on which image formation is completed is to be discharged.

4. An image forming apparatus comprising:
a plurality of microprocessors;
a plurality of storage units storing control programs respectively provided in association with the plurality of microprocessors;
an update unit configured to update the control programs stored in the respective storage units;
a selection unit configured to enable selection of functions to be used in an image forming job caused to be executed by the image forming apparatus; and
a control unit configured to, during execution of update of a control program targeted for update by said update unit, select, out of the functions made selectable by said selection unit, a function which does not use a microprocessor associated with the control program targeted for update, and present the selected function as an alternative function instead of a function which uses a microprocessor associated with the control program targeted for update.

5. The image forming apparatus according to claim 4, wherein during execution of update of the control program targeted for update by said update unit, said control unit presents to the user a unit for selecting whether to execute the image forming job in a mode using the alternative function which does not use the microprocessor associated with the control program targeted for update or to stop execution of the image forming job which uses the microprocessor associated with the control program targeted for update.

6. The image forming apparatus according to claim 4, further comprising a holding unit configured to hold remaining update amount information indicative of a remaining amount of update of the control program targeted for update, and
wherein during execution of update of the control program targeted for update by said update unit, when the remaining amount of update of the control program targeted for update indicated by the remaining update amount information held by said holding unit is smaller than a predetermined value, said control unit enables the function which uses a microprocessor associated with the control program targeted for update.

7. The image forming apparatus according to claim 4, wherein when the update of the control program targeted for update is completed during execution of the image forming job by switching an operation mode of the image forming job to an operation mode using the alternative function which does not use the microprocessor associated with the control program targeted for update, the operation mode is switched back to an original operation mode designated before being switched to the operation mode using the alternative function.

8. The image forming apparatus according to claim 4, wherein the functions to be used in the image forming job include a function of designating one of a plurality of sheet feeders provided in the image forming apparatus, for sheet feed, a function of designating one of single-sided printing in which image formation is performed on a single side of a sheet and double-sided printing in which image formation is performed on both sides of the sheet, and a function of designating one of a plurality of discharge sections provided in the image forming apparatus, as a sheet discharge destination where the sheet on which image formation is completed is to be discharged.

9. A non-transitory computer-readable storage medium storing a computer-executable program for causing a computer to execute a method of controlling an image forming apparatus including a plurality of microprocessors and a plurality of storage units storing control programs provided in association with the respective microprocessors,
wherein the method comprises:
updating the control programs stored in the respective storage units;
enabling selection of functions to be used in an image forming job caused to be executed by the image forming apparatus; and controlling, during execution of update of a control program targeted for update by said updating, said enabling of the selection so as to prevent selection of a function which uses a microprocessor associated with the control program targeted for update, and so as to enable selection of a function which does not use the microprocessor associated with the control program targeted for update.

10. A non-transitory computer-readable storage medium storing a computer-executable program for causing a computer to execute a method of controlling an image forming apparatus including a plurality of microprocessors and a plurality of storage units storing control programs provided in association with the respective microprocessors, wherein the method comprises:

updating the control programs stored in the respective storage units;

enabling selection of functions to be used in an image forming job caused to be executed by the image forming apparatus; and selecting, during execution of update of a control program targeted for update by said updating, out of the functions made selectable by said enabling of the selection, a function which does not use a microprocessor associated with the control program targeted for update, and presenting the selected function as an alternative function instead of a function which uses a microprocessor associated with the control program targeted for update.

* * * * *